United States Patent
Makinen et al.

(10) Patent No.: US 12,401,778 B2
(45) Date of Patent: Aug. 26, 2025

(54) MULTI-FRAME DECOMPOSITION METHOD FOR IMAGE RENDERING ON MULTILAYER DISPLAYS

(71) Applicant: InterDigital Madison Patent Holdings, SAS, Paris (FR)

(72) Inventors: Jukka-Tapani Makinen, Oulu (FI); Markku Alamaki, Espoo (FI)

(73) Assignee: InterDigital Madison Patent Holdings, SAS, Paris (FR)

( * ) Notice: Subject to any disclaimer, the term of this patent is extended or adjusted under 35 U.S.C. 154(b) by 336 days.

(21) Appl. No.: 17/426,311

(22) PCT Filed: Jan. 28, 2020

(86) PCT No.: PCT/US2020/015459
§ 371 (c)(1),
(2) Date: Jul. 28, 2021

(87) PCT Pub. No.: WO2020/160024
PCT Pub. Date: Aug. 6, 2020

(65) Prior Publication Data
US 2022/0109824 A1    Apr. 7, 2022

Related U.S. Application Data

(60) Provisional application No. 62/799,480, filed on Jan. 31, 2019.

(51) Int. Cl.
*G02B 30/31* (2020.01)
*H04N 13/307* (2018.01)
(Continued)

(52) U.S. Cl.
CPC ........... *H04N 13/312* (2018.05); *G02B 30/31* (2020.01); *H04N 13/307* (2018.05); *G02B 30/32* (2020.01)

(58) Field of Classification Search
CPC ...... G02B 30/31; G02B 30/32; H04N 13/312; H04N 13/307; H04N 13/31
See application file for complete search history.

(56) References Cited

U.S. PATENT DOCUMENTS

| | | |
|---|---|---|
| 2003/0063244 A1 | 4/2003 | Fujimori et al. |
| 2014/0063077 A1 | 3/2014 | Wetzstein |

(Continued)

FOREIGN PATENT DOCUMENTS

| | | |
|---|---|---|
| JP | H08136884 A | 5/1996 |
| JP | 2003149683 A | 5/2003 |

(Continued)

OTHER PUBLICATIONS

International Search Report and Written Opinion of the International Searching Authority for PCT/US2020/015459 mailed Apr. 28, 2020, 12 pages.

(Continued)

*Primary Examiner* — Dennis P Joseph
(74) *Attorney, Agent, or Firm* — Smadar Gefen

(57) ABSTRACT

Systems and methods are described for displaying a light field using a display device in which a plurality of internal light paths contribute to each respective output beam and in which each light path traverses at least one controllable-transparency pixel of the display. In example methods, a target light field is partitioned into a plurality of light field partitions that sum to the target light field. Each light field partition is associated with a subset of the internal light paths. Pixel values of the display device are selected to minimize a total error in each path's contribution to its corresponding light field partition. Methods described herein may be used to select pixel values in display devices that include a diffractive element, such as a diffraction grating.

18 Claims, 19 Drawing Sheets

(51) Int. Cl.
*H04N 13/312* (2018.01)
*G02B 30/32* (2020.01)

(56) References Cited

U.S. PATENT DOCUMENTS

| | | | |
|---|---|---|---|
| 2015/0326921 | A1 | 11/2015 | Makovetsky et al. |
| 2016/0373701 | A1* | 12/2016 | Ferri .................... G03B 35/16 |
| 2017/0255104 | A1* | 9/2017 | Polo ..................... G01B 11/00 |
| 2020/0169725 | A1 | 5/2020 | Hua et al. |
| 2021/0271734 | A1* | 9/2021 | Imai ..................... G06F 7/78 |

FOREIGN PATENT DOCUMENTS

| | | |
|---|---|---|
| KR | 20160045770 A | 4/2016 |
| WO | 2019221993 A1 | 11/2019 |

OTHER PUBLICATIONS

Cao, Xuan, et al., "Load-balancing Multi-LCD Light Field Display". Stereoscopic Displays and Applications XXVI, Proceeding of SPIE, International Society for Optics and Photonics, vol. 9391, Mar. 16, 2015, 14 pages.

Wetzstein, Gordon, et al. "Tensor Displays: Compressive Light Field Synthesis using Multiplayer Displays with Directional Backlighting". ACM Transactions on Graphics 31, No. 4, Jul. 1, 2012, pp. 1-11 (11 pages).

Zhang, Jiahui, et al., "Unified Mathematical Model for Multilayer-Multiframe Compressive Light Field Displays Using LCDs". IEEE Transactions on Visualization and Computer Graphics, vol. 25, No. 3, Mar. 2019, pp. 1603-1614.

Heide, Felix, et al., "Cascaded Displays: Spatiotemporal Supperesolution Using Offset Pixel Layers". ACM Transactions on Graphics, ACM, vol. 33, No. 4. Jul. 27, 2014, pp. 1-11.

International Preliminary Report on Patentability for PCT/US2020/015459 issued on Jul. 27, 2021 (8 pages).

Wetzstein, Gordon, et al. "Layered 3D: tomographic image synthesis for attenuation-based light field and high dynamic range displays." In ACM SIGGRAPH 2011 papers, 2011, Article 95, pp. 1-12 (12 pages).

Lanman, Douglas, et al. "Content-adaptive parallax barriers: optimizing dual-layer 3D displays using low-rank light field factorization." In ACM Transactions on Graphics 29, No. 6, 2010, Article 163, pp. 1-11 (11 pages).

Gotoda, Hironobu. "A multilayer liquid crystal display for autostereoscopic 3D viewing". Proc. SPIE 7524, Stereoscopic Displays and Applications XXI, 2010, 75240P (8 pages).

Lee et al., "Integrating Grey Relational Analysis and Multi-Dimensional Scaling for TFT-LCD Competitiveness", 2012 2nd International Conference on Financial Management and Economics (ICFME 2012), Dec. 31, 2012, 4 pages.

Chen et al., "Liquid crystal multi-layer 3D display system and algorithm design", Chinese Journal of Liquid Crystals and Displays, No. 04, Apr. 15, 2017, 6 pages.

\* cited by examiner

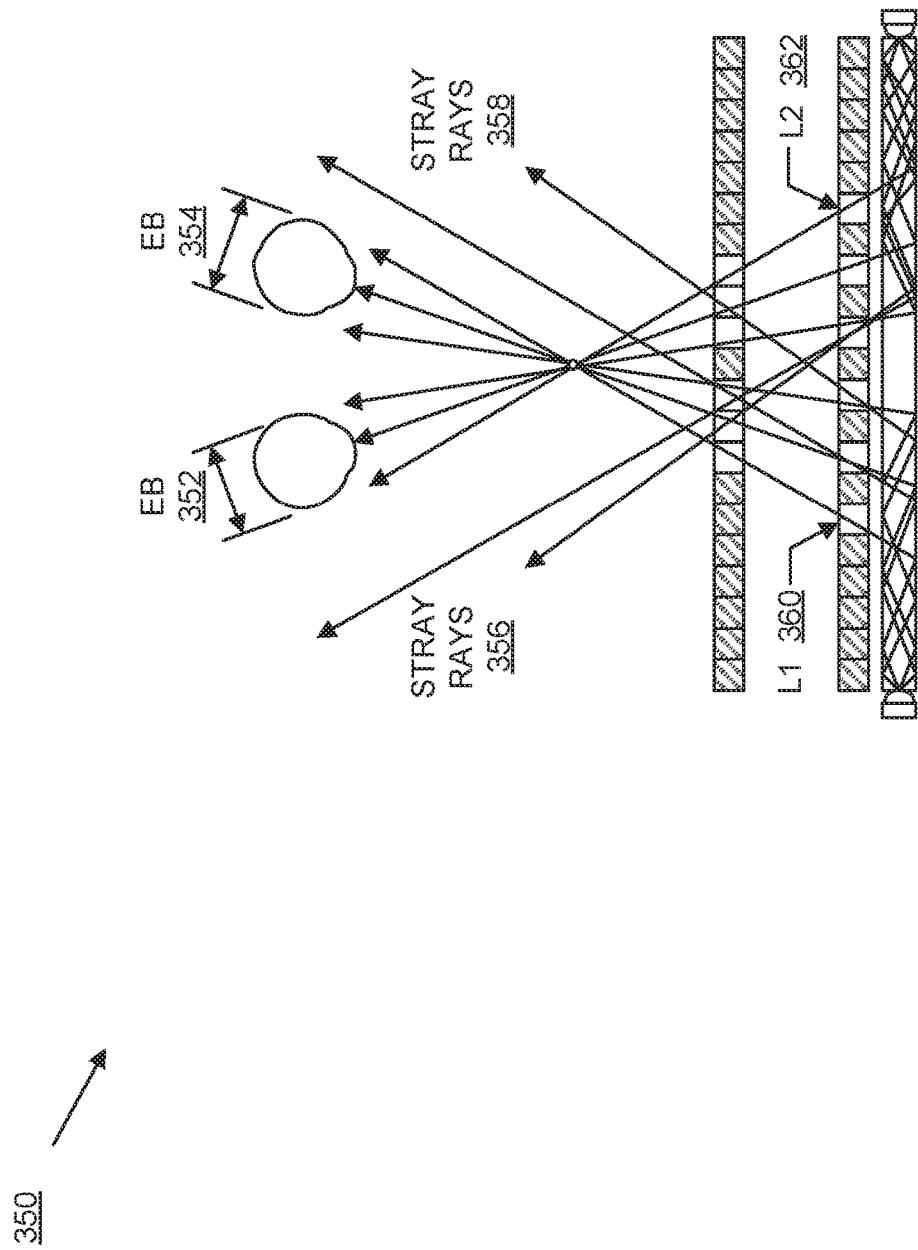

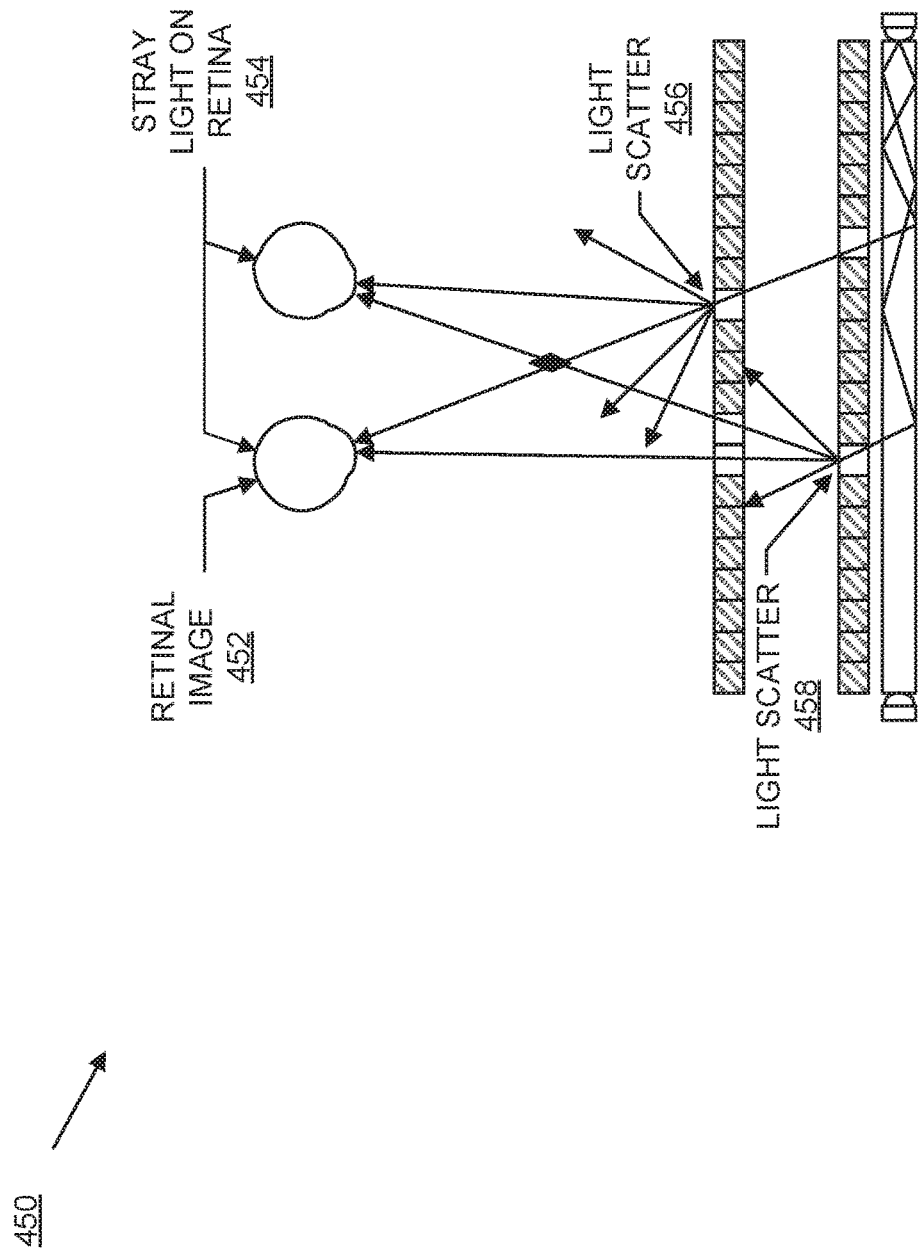

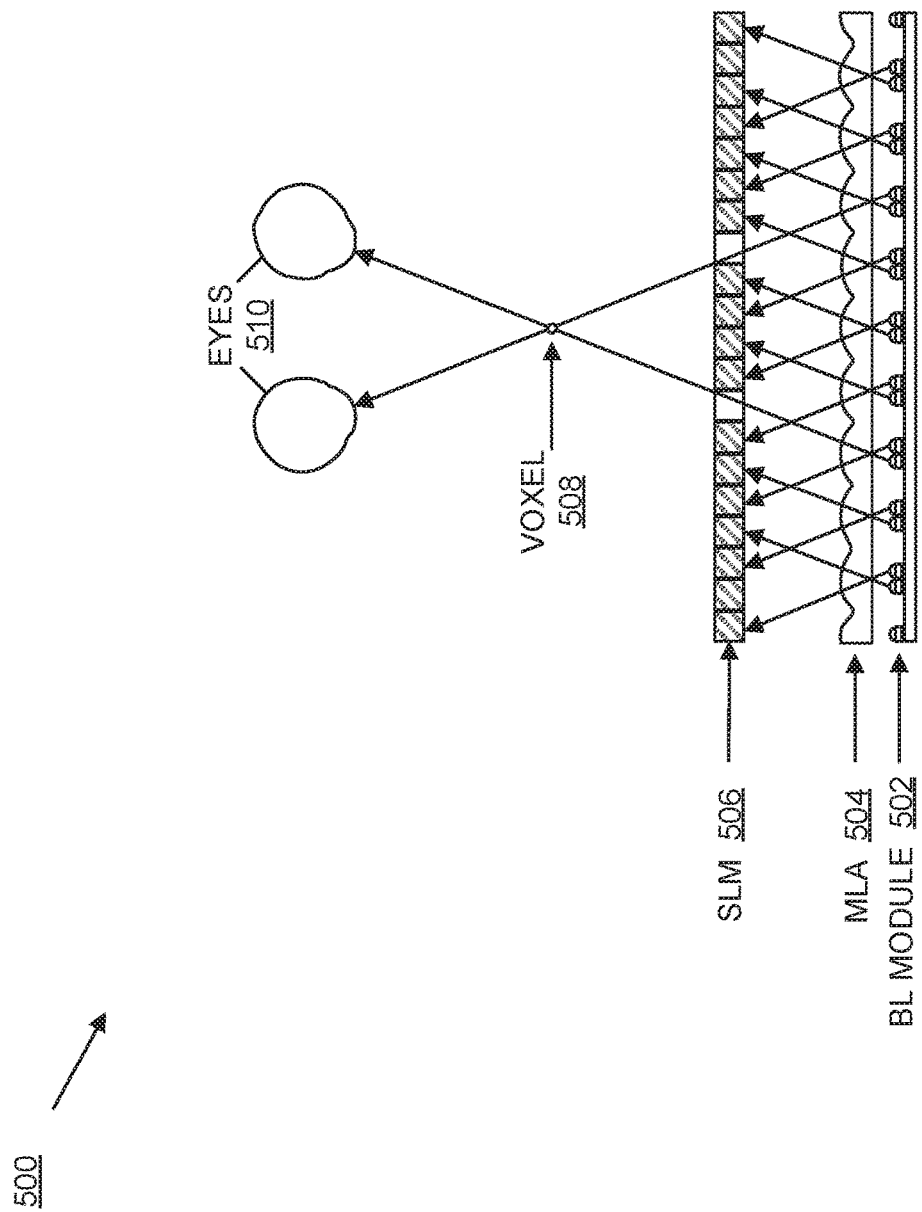

MULTI-FRAME DECOMPOSITION METHOD FOR IMAGE RENDERING ON MULTILAYER DISPLAYS

CROSS-REFERENCE TO RELATED APPLICATIONS

The present application is a national stage application under 35 U.S.C. § 371 of International Application No. PCT/US2020/015459, entitled "MULTI-FRAME DECOMPOSITION METHOD FOR IMAGE RENDERING ON MULTILAYER DISPLAYS," filed on Jan. 28, 2020, which claims benefit under 35 U.S.C. § 119 (e) from U.S. Provisional Patent Application Ser. No. 62/799,480, entitled "Multi-Frame Decomposition Method For Image Rendering On Multilayer SLM Light Field Displays," filed Jan. 31, 2019 which are hereby incorporated by reference in their respective entirety.

BACKGROUND

Displaying visual information is often achieved by using displays that control the color and luminance of multiple small pixels that emit light to all directions. Information about three-dimensional scenes on such displays is usually represented as a single 2D-image projection of the 3D scene. This may not be the optimal way to view a 3D scene. Although multiple display paradigms exist that improve the visual experience, it may be argued that the best visual experience would be produced by a display that may produce any arbitrary distribution of luminance and color as a function of position and viewing direction. This luminance distribution is often called a light field, or the plenoptic function. A light field display with sufficient accuracy may be able to display a synthetic light field that is indiscernible from a real one to a human viewer.

The human mind perceives and determines depths of observed objects in part by receiving signals from muscles used to orient each eye. This eye convergence uses simple triangulation method for estimating the object distance. The brain associates the relative angular orientations of the eyes with the determined depths of focus. Eye muscles connected to the single eye lens automatically adjust the lens shape in such a way that the eye is focused to the same distance to which the two eyes are converged. Correct retinal focus cues give rise to a natural image blur on objects outside of an observed focal plane and a natural dynamic parallax effect. In a natural setting, both the eye convergence and retinal focus cues are coherent. Correct retinal focus cues may call for very high angular density light fields which may involve certain challenges to produce (e.g., producing a sufficiently accurate 3D display that is capable of emitting the necessary light rays). In addition, the rendering of the artificial image may call for a high degree of fidelity.

SUMMARY

An example method of operating a display device for emitting a plurality of emitted light beams, the display device being configured such that at least one of the emitted light beams includes contributions from a plurality of internal optical paths in accordance with some embodiments may include: determining a target beam value for at least the first emitted light beam; partitioning the target beam value into a plurality of beam value partitions, each beam value partition being associated with a corresponding one of the internal optical paths that contributes to the first emitted light beam; and based at least in part on the beam value partitions, selecting a transmittance value for at least one controllable-transparency pixel along at least one of the internal optical paths that contributes to the first emitted light beam.

For some embodiments of the example method, selecting the transmittance value comprises iteratively adjusting transmittance values of a plurality of controllable-transparency pixels to reduce a sum of a plurality of error terms, each error term being a square difference between (i) a beam value partition of an exit light beam and (ii) a corresponding contribution of one of the internal optical paths. The iterative adjustment may be performed to substantially minimize the sum of the plurality of error terms.

For some embodiments of the example method, at least a plurality of error terms may be represented as $(L_{i,p} - d_{i,p} L_i^{target})^2$, wherein $L_{i,p}$ may be a contribution to an emitted light beam i by an internal optical path p, wherein $L_i^{target}$ may be a target beam value for emitted light beam i, and wherein $d_{i,p} L_i^{target}$ may be a beam value partition.

For some embodiments of the example method, $L_{i,p}$ may be a product of factors that may include a contribution strength constant $c_{i,p}$, and at least one transmittance value of at least one controllable-transparency pixel along the optical path p.

For some embodiments of the example method, selecting transmittance values may include selecting transmittance values to substantially minimize the value of the following expression $$\sum_{i=1}^{I} \sum_{p=1}^{P} W_i c_{i,p}^2 \left( \frac{1}{M} \sum_{m=1}^{M} \prod_{n=1}^{N} T_{n,m,f(n,p,i)} - \frac{d_{i,p}}{c_{i,p}} L_i^{target} \right)^2,$$

wherein: i is an index over emitted light beams; p is an index over internal optical paths; $W_i$ is a weighting associated with respective light beam i; $c_{i,p}$ is a contribution strength constant proportional to a contribution of internal optical path p to exit light beam i; M is a number of multiplexed frames; m is an index over multiplexed frames; N is a number of layers of controllable-transparency pixels; n is an index over controllable-transparency pixel layers; $f(n, p, i)$ is an index of a controllable-transparency pixel in layer n along internal optical path p to emitted light beam i; $T_{n,m,f(n,p,i)}$ is a transmittance value of a controllable-transparency pixel $f(n, p, i)$ in layer n during multiplexed frame m; $d_{i,p}$ is a partitioning constant; and $L_i^{target}$ is a target beam value for emitted light beam i.

For some embodiments of the example method, wherein selecting transmittance values may include selecting transmittance values to substantially minimize the value of the following expression $$\sum_{i=1}^{I} \sum_{p=1}^{P} c_{i,p}^2 \left( \prod_{n=1}^{N} T_{n,f(n,p,i)} - \frac{d_{i,p}}{c_{i,p}} L_i^{target} \right)^2,$$

wherein: i is an index over emitted light beams; p is an index over internal optical paths; $c_{i,p}$ is a contribution strength constant proportional to a contribution of internal optical path p to exit light beam i; N is a number of layers of controllable-transparency pixels; n is an index over controllable-transparency pixel layers; $f(n, p, i)$ is an index of a controllable-transparency pixel in layer n along internal optical path p to emitted light beam i; $T_{n,f(n,p,i)}$ is a transmittance value of a controllable-transparency pixel $f(n, p, i)$ in layer n; $d_{i,p}$ is a partitioning constant; and $L_i^{target}$ is a target beam value for emitted light beam i.

For some embodiments of the example method, selecting transmittance values may include selecting transmittance values to substantially minimize the value of the following expression $$\sum_{i=1}^{I}\sum_{p=1}^{P}W_i c_{i,p}^2 \left(\prod_{n=1}^{N} T_{n,f(n,p,i)} - \frac{d_{i,p}}{c_{i,p}}L_i^{target}\right)^2,$$

wherein: i is an index over emitted light beams; p is an index over internal optical paths; $W_i$ is a weighting associated with respective light beam i; $c_{i,p}$, is a contribution strength constant proportional to a contribution of internal optical path p to exit light beam i; N is a number of layers of controllable-transparency pixels; n is an index over controllable-transparency pixel layers; $f(n, p, i)$ is an index of a controllable-transparency pixel in layer n along internal optical path p to emitted light beam i; $T_{n,f(n,p,i)}$ is a transmittance value of a controllable-transparency pixel $f(n, p, i)$ in layer n; $d_{i,p}$ is a partitioning constant; and $L_i^{target}$ is a target beam value for emitted light beam i.

For some embodiments of the example method, selecting transmittance values may include selecting transmittance values to substantially minimize the value of the following expression $$\sum_{i=1}^{I}\sum_{p=1}^{P} c_{i,p}^2 \left(\frac{1}{M}\sum_{m=1}^{M}\prod_{n=1}^{N} T_{n,m,f(n,p,i)} - \frac{d_{i,p}}{c_{i,p}}L_i^{target}\right)^2,$$

wherein: i is an index over emitted light beams; p is an index over internal optical paths; $c_{i,p}$ is a contribution strength constant proportional to a contribution of internal optical path p to exit light beam i; M is a number of multiplexed frames; m is an index over multiplexed frames; N is a number of layers of controllable-transparency pixels; n is an index over controllable-transparency pixel layers; $f(n, p, i)$ is an index of a controllable-transparency pixel in layer n along internal optical path p to emitted light beam i; $T_{n,m,f(n,p,i)}$ is a transmittance value of a controllable-transparency pixel $f(n, p, i)$ in layer n during multiplexed frame m; $d_{i,p}$ is a partitioning constant; and $L_i^{target}$ is a target beam value for emitted light beam i.

For some embodiments of the example method, determining the target beam value for at least the first emitted light beam may be based on information characterizing a light field.

For some embodiments of the example method, selecting of a transmittance value may be performed using non-negative tensor factorization (NTF).

For some embodiments of the example method, a value of each partitioning constant $d_{i,p}$ may be selected based on a corresponding contribution strength constant $c_{i,p}$.

For some embodiments of the example method, a value of each partitioning constant $d_{i,p}$ may be selected to be proportional to a corresponding contribution strength constant $c_{i,p}$.

For some embodiments, the method further includes, based at least in part on the beam value partitions, selecting a luminance value (or other value representing a light output) for at least one light-emitting element at a beginning of at least one of the internal optical paths.

An example apparatus in accordance with some embodiments may include: a processor configured to perform at least: determining a target beam value for at least a first emitted light beam of a display device operative to emit a plurality of emitted light beams, the display device being configured such that at least one of the emitted light beams includes contributions from a plurality of internal optical paths; partitioning the target beam value into a plurality of beam value partitions, each beam value partition being associated with a corresponding one of the internal optical paths that contributes to the first emitted light beam; and based at least in part on the beam value partitions, selecting a transmittance value for at least one controllable-transparency pixel along at least one of the internal optical paths that contributes to the first emitted light beam.

Some embodiments of the example apparatus may further include: a light-emitting layer; and at least two spatial light modulator layers overlaying the light-emitting layer, the spatial light modulator layers including a plurality of controllable-transparency pixels including the at least one controllable-transparency pixel, wherein the internal optical paths extend from the light-emitting layer through the at least two spatial light modulator layers.

For some embodiments of the example apparatus, a plurality of the internal light paths may traverse at least one beam-splitting element.

BRIEF DESCRIPTION OF THE DRAWINGS

FIG. 3B is a schematic plan view illustrating an example light field display, with two SLMs and a BL module, forming a voxel using more than two rays according to some embodiments.

FIG. 4B is a schematic plan view illustrating an example light field display with two SLMs forming a voxel using light ray scattering according to some embodiments.

FIG. 5A is a schematic plan view illustrating an example light field display structure with an SLM and a directional backlight according to some embodiments.

The entities, connections, arrangements, and the like that are depicted in—and described in connection with—the various figures are presented by way of example and not by way of limitation.

Example Networks for Implementation of the Embodiments

A wireless transmit/receive unit (WTRU) may be used, e.g., as a light field display in some embodiments described herein.

Figure 1A:
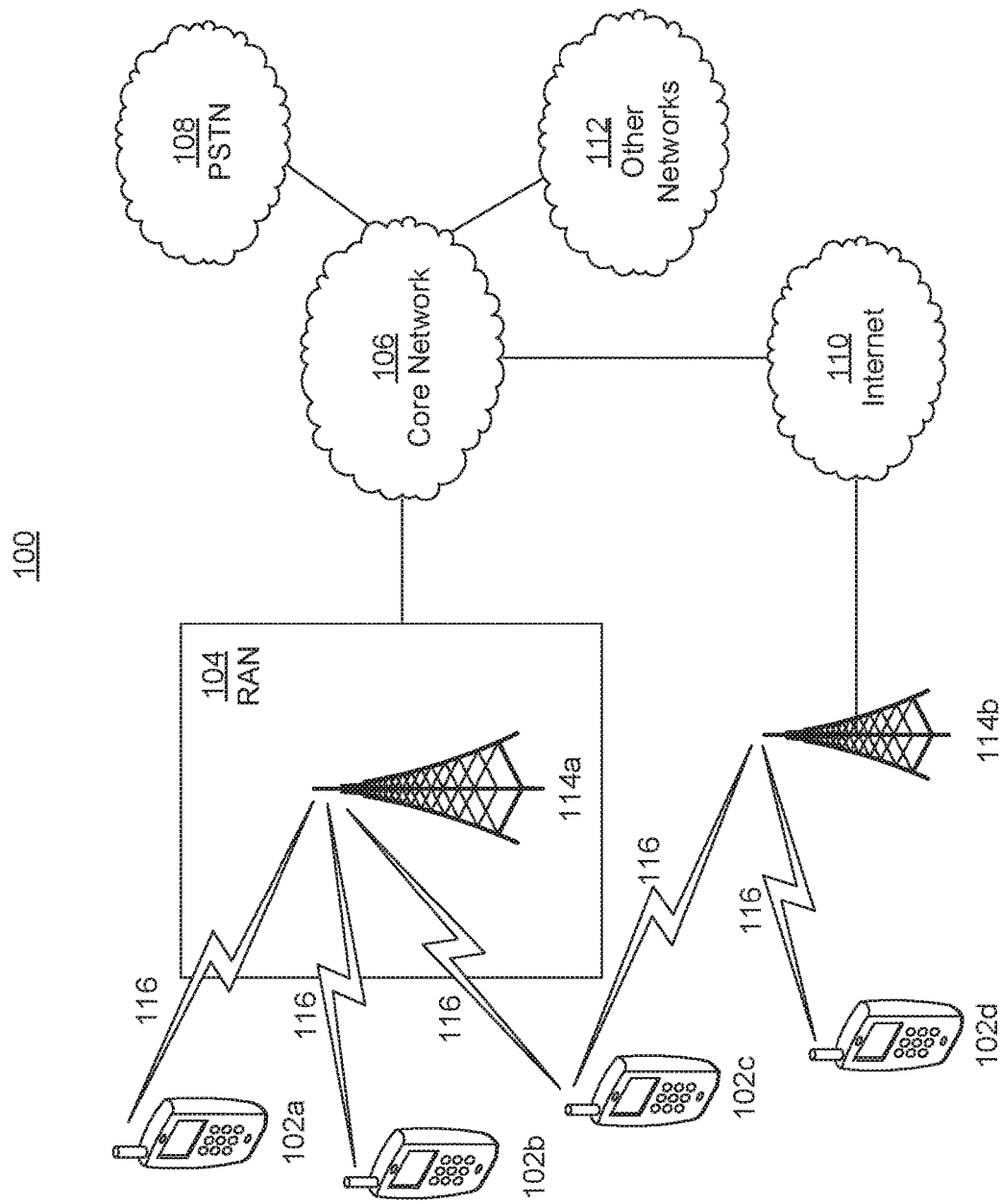
FIG. 1A is a system diagram illustrating an example communications system according to some embodiments.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (Wireless Fidelity (WiFi), IEEE 802.16 (Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
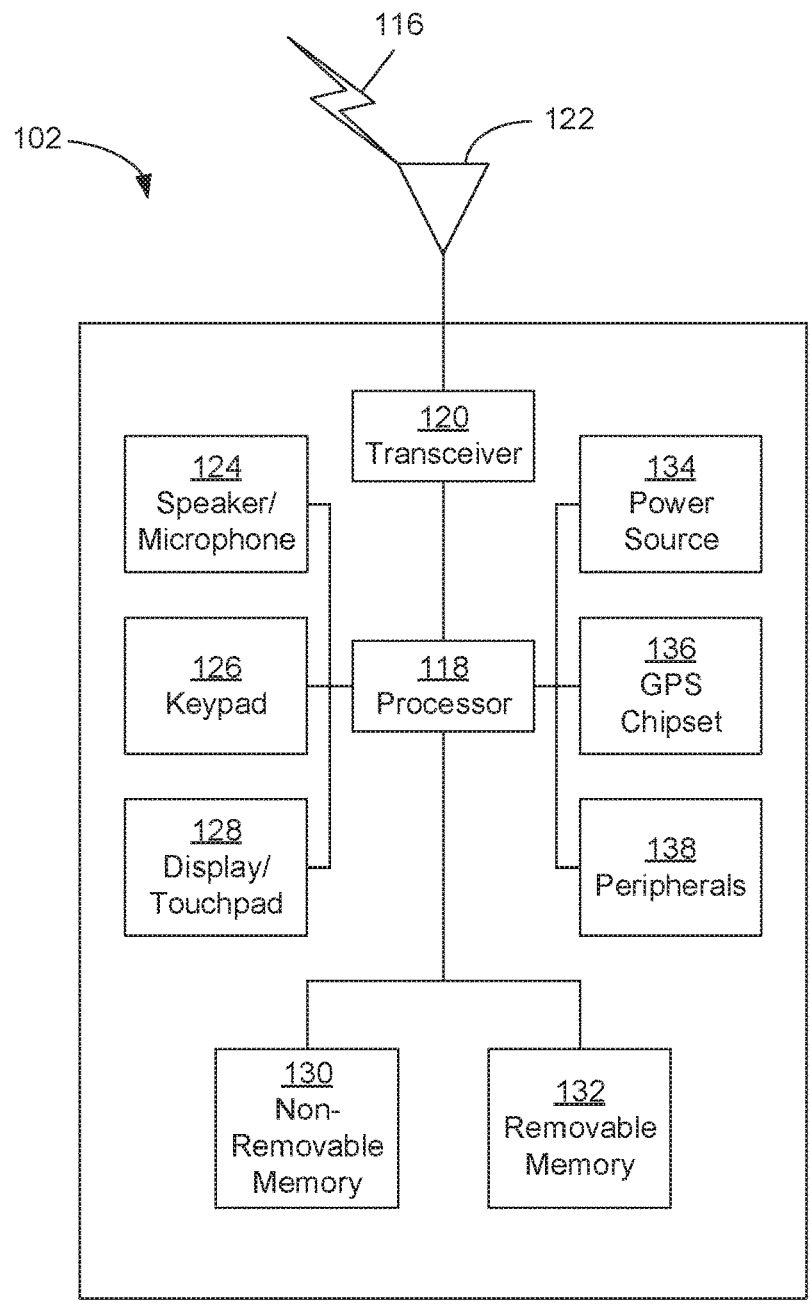
FIG. 1B is a system diagram illustrating an example wireless transmit/receive unit (WTRU) that may be used within the communications system illustrated in FIG. 1A according to some embodiments.
Figure 1C:
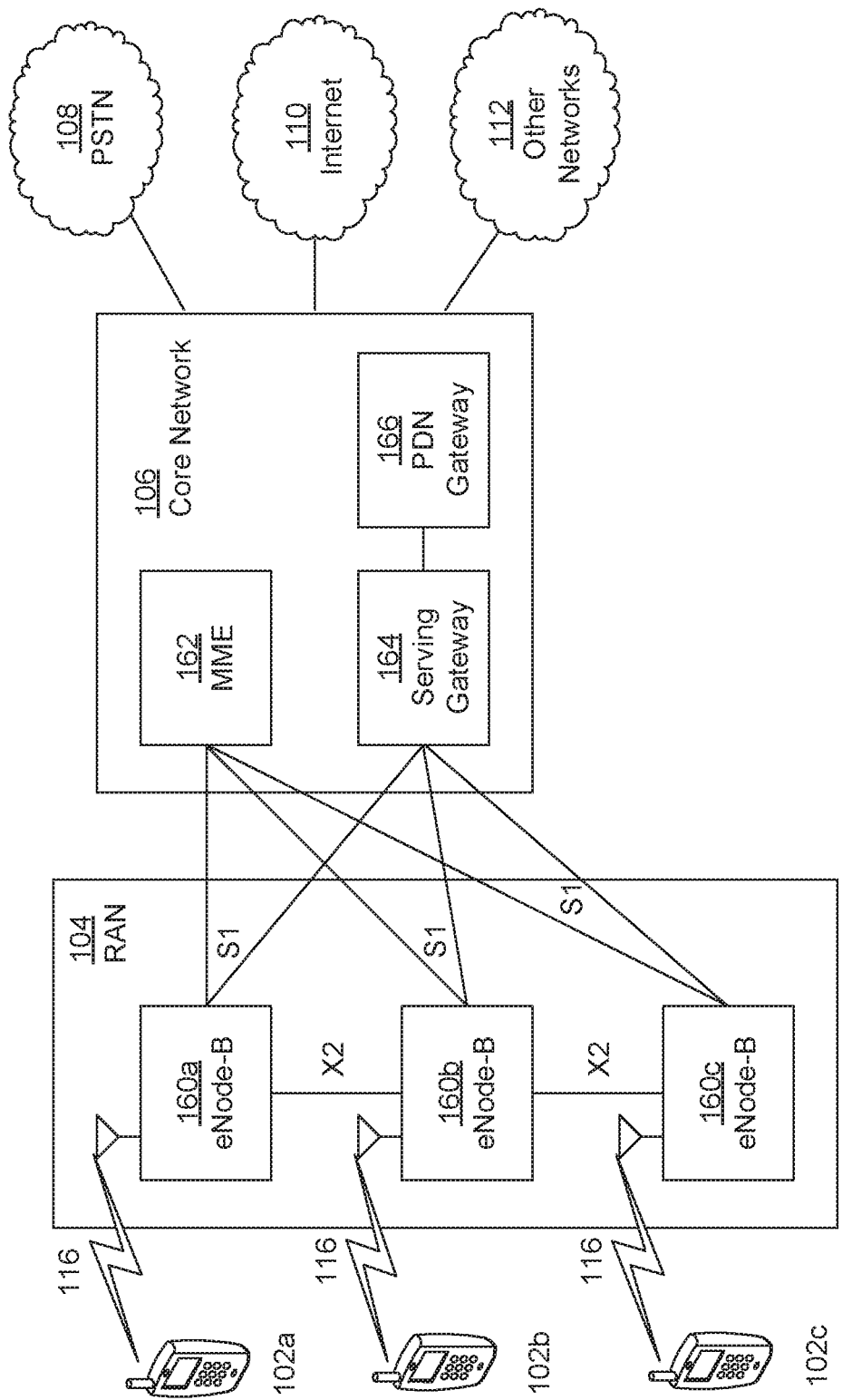
FIG. 1C is a system diagram of an example system illustrating an example radio access network (RAN) and an example core network (CN) that may be used within the communications system illustrated in FIG. 1A according to some embodiments.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
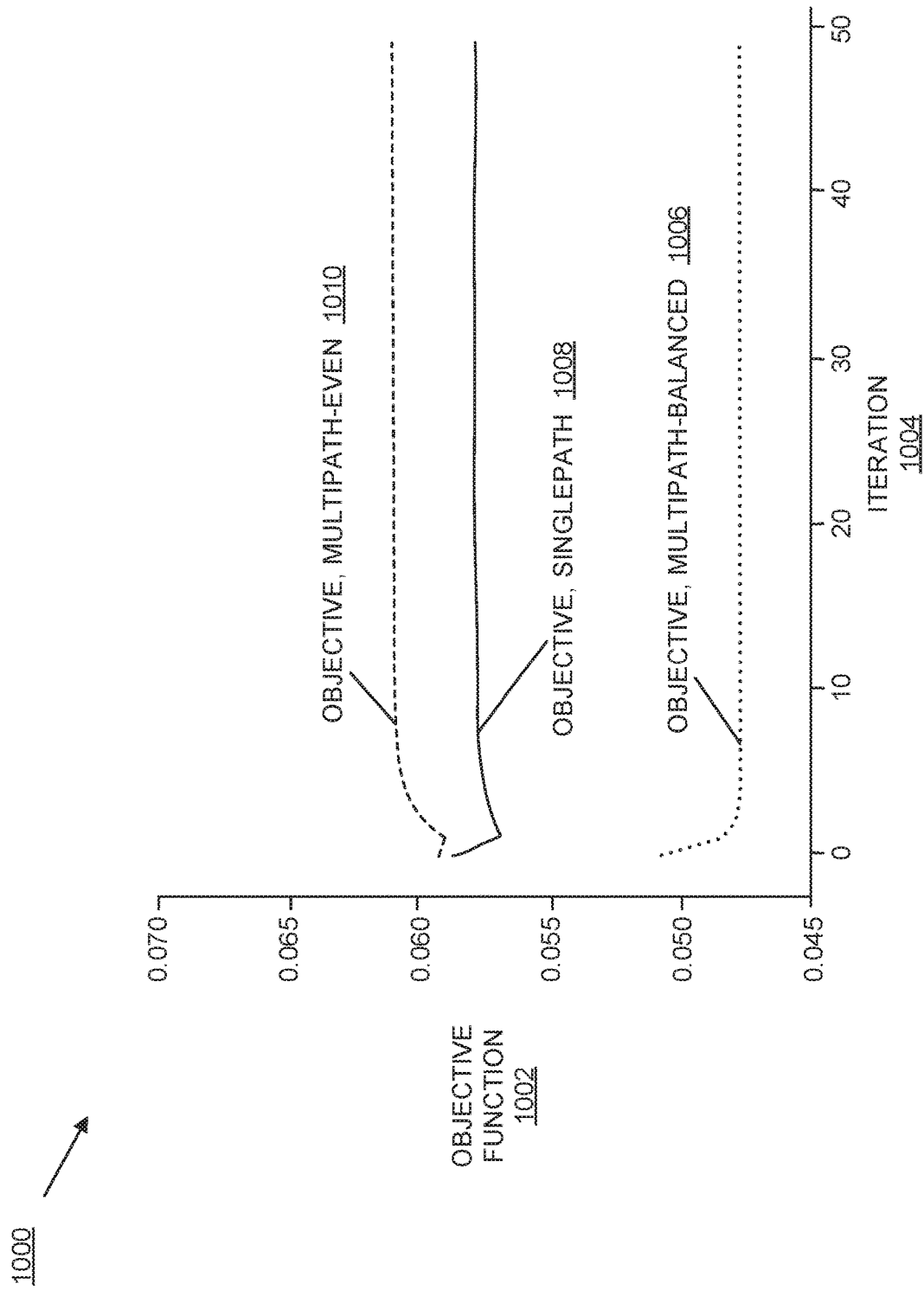
FIG. 10 is a line graph illustrating a convergence for each of three optimization methods according to some embodiments.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
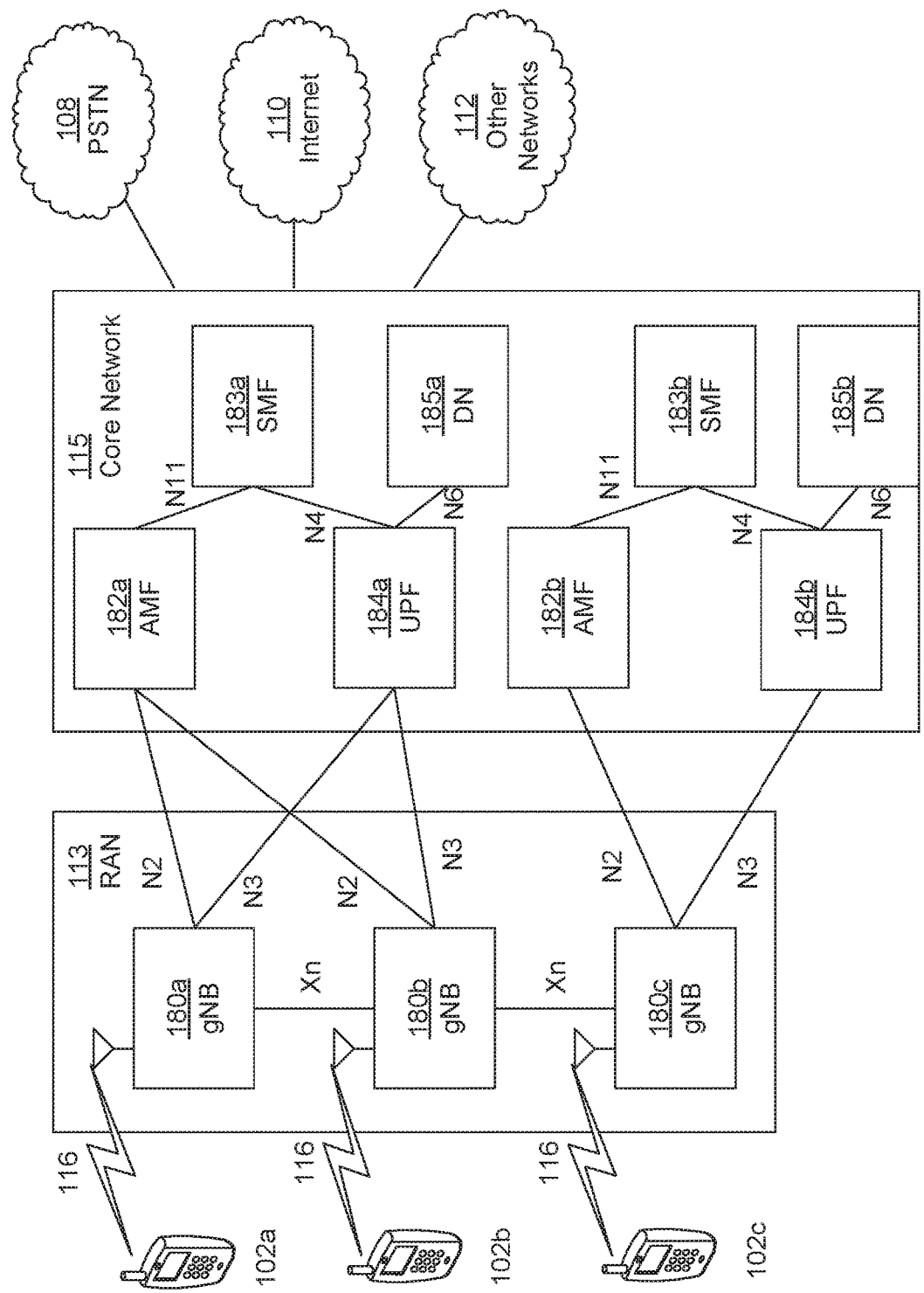
FIG. 1D is a system diagram of an example system illustrating a further example RAN and a further example CN that may be used within the communications system illustrated in FIG. 1A according to some embodiments.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

3D Image Perception and Different 3D Display Types

Multiple different optical methods exist that could be used to create a light field display. These methods may include, for example, electroholography, integral imaging, parallax barriers, and beam redirection. In electroholography, dense spatial light modulators (SLMs) are used to modulate coherent monochromatic light, which creates the light field as a wavefront. In integral imaging, a microlens array is placed in front of a 2D display. This divides the resolution of the underlying display to spatial and angular domains. In parallax barrier methods, an array of static pinholes or slits is used to selectively block light. Dynamic barriers also may be used, which are usually implemented with an SLM, or multiple stacked SLMs. Parallax barrier displays also may include time multiplexing by displaying multiple different patterns (usually called frames) on the SLMs, so that the frames get integrated together due to persistence of vision. In beam redirection methods, beams of light are time sequentially scanned while their intensity is modulated. This method may be implemented for example with a directional backlight whose intensity is modulated by an SLM. Alternatively, it may be implemented by having an array of intensity-controlled beam generators combined with a beam redirection method.

The vergence-accommodation conflict (VAC) is a determined driver for moving from the current stereoscopic 3D displays based on integral imaging to the more advanced high angular resolution light field systems. A high-quality 3D light field display should be able to produce both the correct eye convergence and retinal focus cues simultaneously without VAC. In conventional stereoscopic multiview displays, image points lie on a surface of a display and only two illuminated pixels (one visible for each eye) are used in representing a 3D point. This method uses eye convergence for creation of the 3D visual effect, but it is not capable of producing the correct retinal focus cues as the angular density of the emitted light field is not high enough.

One type of 3D display capable of providing correct focus cues uses volumetric display techniques that may produce 3D images in true 3D space. Each voxel of a 3D image is located physically at the spatial position where it is supposed to be and reflects or emits light from that position toward the observers to form a real image in the eyes of viewers. Problems with 3D volumetric displays include their low resolution, large physical size and expensive manufacturing costs. These issues may make them too cumbersome to use outside of special cases e.g., product displays, museums, shows, etc. Another type of 3D display device capable of providing correct retinal focus cues is the holographic display. Holographic displays aim to reconstruct whole light wavefronts scattered from objects in natural settings. A problem with this technology is the lack of suitable Spatial Light Modulator (SLM) components that could be used in the creation of the extremely detailed wavefronts.

Image Rendering with Stacked Parallax Barrier Displays

A high-resolution light field display may include the use of multiple stacked spatial light modulators (SLM). A single SLM may be used effectively as a parallax barrier that selectively blocks the underlying light emitting pixels from viewers sight. The parallax barrier is used as an angular filter that allows the pixels to be visible only from some specific directions. By stacking multiple SLMs on top of each other, the angular resolution may be increased further and a true LF display may be constructed with hardware that also may be made relatively thin. The main negative effects of using a SLM stack are the reduced illumination efficiency leading to high energy consumption and higher computational load coming from the complex display control optimization calculations used for image rendering.

If parallax barrier displays incorporating multiple stacked SLMs are used, the task of selecting the frames to display on each of the SLMs is usually a complex optimization task. Multiple different methods exist for this optimization task, and which method is effective depends on the structure of the display. For some embodiments, a display may include a static backlight covered by an SLM and a pinhole array that blocks most light but lets light through some small holes. For some embodiments, the pinhole array may be in front of the SLM.

Figure 2:
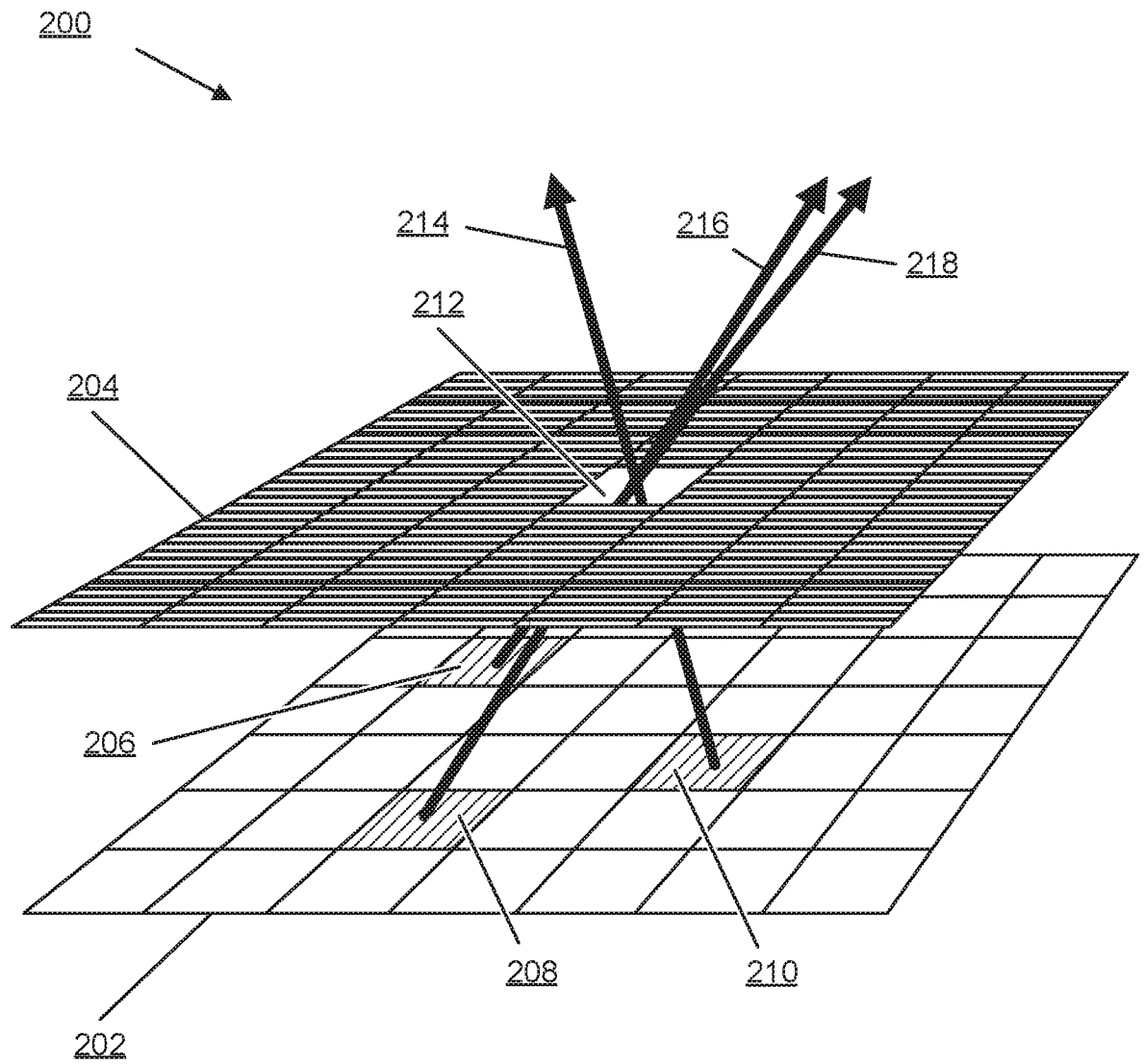
FIG. 2 is a schematic perspective view illustrating an example multidirectional pixel of a pinhole-based light field display according to some embodiments.

FIG. 2 is a schematic perspective view illustrating an example multidirectional pixel of a pinhole-based light field display according to some embodiments. In some embodiments of a display structure 200, each of the pinholes 212 in a pinhole layer 204, together with the underlying pixels 206, 208, 210 of a pixel layer 202 form a multidirectional pixel (MDP) of light beams 214, 216, 218 as depicted in the figure. Repeating this pattern in both the x and y directions gives the display structure. In this case the optimization may be done, for example, by matching the luminance of the light rays that pass the center points of the pixels to the target light ray intensities.

Figure 3A:
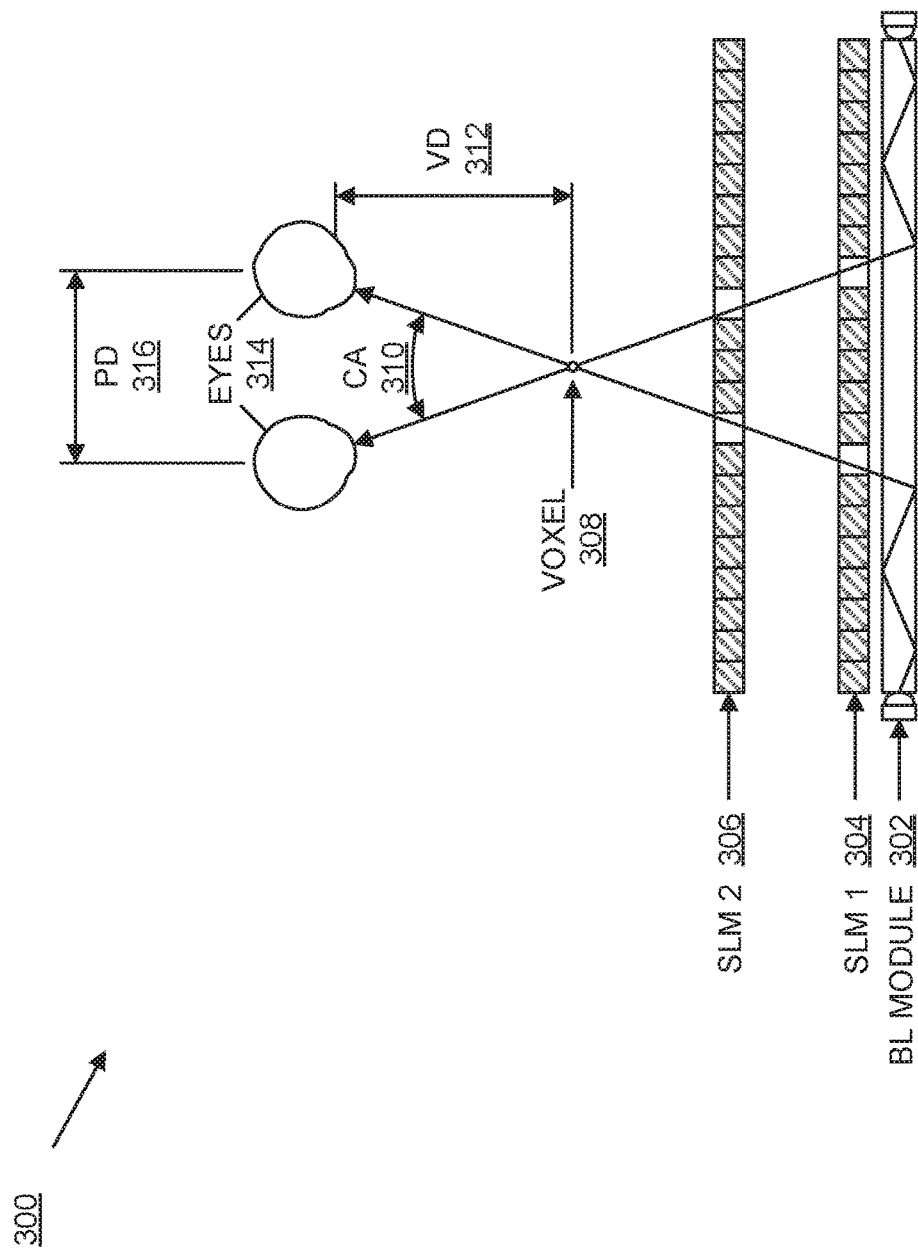
FIG. 3A is a schematic plan view illustrating an example light field display, with two SLMs and a backlight (BL) module, forming a voxel using only two rays according to some embodiments.

FIG. 3A is a schematic plan view illustrating an example light field display, with two SLMs and a backlight (BL) module, forming a voxel using only two rays according to some embodiments. Light is emitted by a light field display 300 from a backlight (BL) module 302 with two LEDs and a lightguide without coupling structures is used for illuminating the back of the first SLM 304. A voxel 308 is formed between the display and viewer by allowing the light to pass through the right pixels on both modulator layers 304, 306. Correct voxel distance (VD) 312 is perceived when the two passed light rays enter the two eye pupils 314 with the right angles initiating the correct eye convergence angle (CA) 310. The viewer visual system is able to discern the VD 312 from the CA 310 and pupil distance (PD) 316. In this idealized case the parallax barrier mask on SLM 2 and light passing apertures on SLM 1 are easy to calculate from the 3D geometry. In real life, the idealized system is usually too simple, and some physical and human viewer factors are taken into account. For some embodiments, the BL module may include one or more internal optical paths for light to travel between a light emitter and an exit point for light to exit the BL module.

FIG. 3B is a schematic plan view illustrating an example light field display, with two SLMs and a BL module, forming a voxel using more than two rays according to some embodiments. As an example, FIG. 3B presents a light field display 350 where more than two rays are used in single voxel formation using more than two openings on both SLM layers. This example rendering modification may be done for at least two reasons: 1) in order to generate the correct retinal focus cues and 2) in order to make the pixel visible area larger. When a bundle of beams are crossing at the voxel position and enter the pupil of the eye, the retinal image has a sharp focus when the eye lens is adjusted to the correct voxel distance. This way multiple rays may be used for initiating the right retinal focus cues for single eyes. When a human observer looks at an object, the eye is not still, but moves constantly with small rotations called saccades. In addition to this, the whole body and head of a person viewing a display that is not attached in front of the eyes moves. This may call for a certain range around each eye where the image is projected in order to account for the unknown position of the eye pupils. One method to do this in real life systems is to form an eye box (EB) 352, 354 that is wider than the eye pupils allowing eye movement. The suitable size of the eyebox 352, 354 may be determined by the display use case.

For a display that includes two stacked SLMs, one factor adding complexity to image rendering is the fact that there may be multiple ray paths through the pixel openings. As an example, FIG. 3A illustrates stray light rays 356, 358 that propagate through the pixels without crossing at the designated voxel position. Some of these rays may hit eye pupils causing stray light that lowers image contrast. This negative effect may be mitigated by temporal control as the apertures may be opened sequentially and thus avoid creating the wrong ray paths. Creation of proper voxel luminance values also entails control over ray light intensities. In some cases, the SLM 1 pixel transmittances may be adjusted according to the image content. For example, the left and right eye may see the same voxel with different luminance values (L1 (360) vs. L2 (362)) as presented in FIG. 3B.

For some embodiments, a display may include two stacked SLMs in front of a static backlight, the optimization may be more complicated than for only one SLM. One solution is to have the front SLM display form an array of pinholes, whose location is changed for each frame, while the back SLM is optimized in the same way as in the case of static pinholes. An alternative method includes content adaptive parallax barriers (as described in D. Lanman, et al., *Content-Adaptive Parallax Barriers: Optimizing Dual-Layer 3D Displays Using Low-Rank Light Field Factorization,* 6 ACM TRANSACTIONS ON GRAPHICS 29 (2010) (Article 163)), which optimizes the frames by using nonnegative matrix factorization (NMF), which will find better solutions at the expense of being more computationally intensive.

For some embodiments, a display may include three or more stacked SLMs in front of a static backlight maybe optimized using, e.g., a technique that includes a sparse matrix (described in G. Hironbu, *A Multilayer Liquid Crystal Display for Autostereoscopic 3D Viewing,* PROC. SPIE 7524: Stereoscopic Displays and Applications XXI, 75240P (2010)); a tomographic method (described in G. Wetzstein, et al., *Layered 3D: Tomographic Image Synthesis for Attenuation-based Light Field and High Dynamic Range Displays,* 4 ACM TRANSACTIONS ON GRAPHICS 30, (2011) (Article 95)); a direct forcing method (described in X. Cao, et al., *Load-Balancing Multi-LCD Light Field Display,* PROC. SPIE 9391: STEREOSCOPIC DISPLAYS AND APPLICATIONS XXVI, 93910F (2015)); and a tensor display method (described in G. Wetzstein, et al., *Tensor Displays: Compressive Light Field Synthesis Using Multilayer Displays with Directional Backlighting,* 31(4) ACM TRANSACTIONS ON GRAPHICS 1-11 (2012)). Of these four methods, the first three (a technique that includes a sparse matrix; a tomographic method; and a direct forcing method) may be suitable for cases where no time multiplexing is used, while the tensor display method may be suitable for time multiplexing. Display methods may also leverage time multiplexing by a load balancing method, e.g., as described in Cao that uses a directional backlight.

Some embodiments improve the ability to render light fields on light field displays based on multiple optical component layers and stacked spatial light modulators. This is achieved by an optimization scheme that allows multiple light propagation paths for each output light ray.

The presented methods enable optimizing image rendering for optical display structures that exhibit real-life physical phenomena, such as light scattering and diffraction. Inclusion of multi-path propagation and real-life beam physical properties improves the 3D light field display image quality.

Some embodiments of systems and methods use light scattering, diffraction, and other real-world physical phenomena to produce higher quality displayed images and reduce display structure complexity for light field displays.

In some embodiments, a sparse light-emitting element array is provided, and a collimating optical layer is provided followed by a diffraction gradient layer that produces multiple copies of a light beam. A spatial light modulator layer is provided, and spatio-temporal control of light illuminating and blocking spatial light modulator layers is provided in a light field display system. In some embodiments, the rendering solution may map a single light illuminating element to more than one light beam in the same or different time epoch.

In some methods of rendering an image to a display, an optical model of a multilayer SLM display system is provided that includes multiple light ray contributions from "adjacent" optical paths/illumination sources. A partitioning is performed of the object function of the optimization problem, which allows for NTF (non-negative tensor factorization) optimization. The light modulation characteristics of the independent light modulating pixels and/or light sources is altered to direct approximately the correct luminance values to the generated voxels, using time multiplexed frames.

The Tensor Display Method

The tensor display method is based on the observation that the light field of some time-multiplexed multi-SLM displays may be represented as a tensor of rank equal to the number of frames. The target light field that is to be reconstructed is transformed into a similar tensor form, and the difference between the two tensors is then minimized with non-negative tensor factorization (NTF). In the case of only a single-color display, the luminance emitted by the display is given as a function of a position on the display (x, y) and the direction ($\theta$, $\phi$). Each set of parameters (x, y, $\theta$, $\phi$) defines a single light ray. The light field may be expressed as the total luminance in each direction L(x,y, $\theta$, $\phi$). By selecting some set of light rays to represent the light field, the light field may be expressed by a vector, as shown in Eq. 1:

$$L_i, i = 1, \ldots, I. \qquad \text{Eq. 1}$$

A display may incorporate multiple intensity modulating SLMs placed in front of (or proximate to) a static display. The SLMs are enumerated by the index n that runs from 1 to N. The transmittance of the $n^{th}$ SLM is designated as $T_{n,h}$, where the index h runs from 1 to H, enumerating the pixels. For some embodiments, each light ray goes through each of the SLMs once, and the intensity of that light ray is the product of the transmittances of the pixels, as in the following expression of Eq. 2:

$$L_i = \prod_{n=1}^{N} T_{n,f(n,i)} \qquad \text{Eq. 2}$$

where $f(n, i)$ gives the pixel index of the n-th SLM, where the i-th light ray goes through the SLM. Although there could be a constant factor that describes the brightness of the backlight, the backlight brightness has been omitted for simplicity. For example, for two SLMs, a light ray of index 6 may be described using the following expression of Eq. 3:

$$L_6 = T_{1,7} T_{2,8} \qquad \text{Eq. 3}$$

In this example, the light ray with an index of 6 goes through pixel number 7 of the first SLM and through pixel number 8 of the second SLM. The exact structure of the function $f$ depends on the display geometry and pixel layouts.

If time multiplexing is used, the luminances may be expressed as the time averages of the multiplexed frames. The light field may be described using the expression of Eq. 4:

$$L_i = \frac{1}{M} \sum_{m=1}^{M} \prod_{n=1}^{N} T_{n,m,f(n,i)} \qquad \text{Eq. 4}$$

where M is the number of multiplexed frames. Notably, an additional index is incorporated into the transmittance tensor to specify that the transmittances are different in each frame. In order to reproduce a given "target" light field $L_i^{target}$, it may be useful to minimize the objective function. The objective function is represented as a weighted and squared difference between the target light field and the actual light field, as in the following expression of Eq. 5:

$$f_{obj}(T) = \qquad \text{Eq. 5}$$

$$\sum_{i=1}^{I} W_i (L_i - L_i^{target})^2 = \sum_{i=1}^{I} W_i \left( \frac{1}{M} \sum_{m=1}^{M} \prod_{n=1}^{N} T_{n,m,f(n,i)} - L_i^{target} \right)^2$$

where $W_i$ is an optional weighting factor. Eq. 5 may be optimized (e.g., minimized) using nonnegative tensor factorization (NTF) for some tensor display methods.

In an alternative mathematical formulation, the indexing over all the light rays is changed to multiple indexes over all the SLM pixels, so that each ordered set of pixels ($h_1$, $h_2$, ..., $h_N$) is summed over all the SLM pixels, where $h_n$ enumerates the pixels in the n-th display. This summation may contain more elements than there are in the original summation, since not all ordered sets of pixels have a corresponding light ray. The weight of these "invalid" light rays may be set to zero, so the summation effectively stays the same. In light of this change in indices, the weighing factor $W_i$ is replaced by $W_{h_1,h_2,\ldots,h_N}$ and target light field $L_i^{target}$ is replaced by $L_{h_1,h_2,\ldots,h_N}^{target}$. The values of the new objects are determined from the objects that they replace according to direct correspondence between the light ray indices i and the pixel indices $h_1, h_2, \ldots, h_N$, whenever the indices $h_1, h_2, \ldots, h_N$, define a valid light ray. When the indices $h_1, h_2, \ldots, h_N$ do not define a valid light ray, the weight $W_{h_1,h_2,\ldots,h_N}$ is zero, and $L_{h_1,h_2,\ldots,h_N}$ is undefined. The resulting objective function is as shown in Eq. 6:

$$f_{obj}(T) = \qquad \text{Eq. 6}$$

$$\sum_{h_1,h_2,\ldots,h_N} W_{h_1,h_2,\ldots,h_N} \left( \frac{1}{M} \sum_{m=1}^{M} \prod_{n=1}^{N} T_{n,m,h_n} - L_{h_1,h_2,\ldots,h_N}^{target} \right)^2$$

where the summations run over all pixels. This expression may be minimized by using a multiplicative update rule, which is described by the expression of Eq. 7:

$$T_{n,m,h_n} \leftarrow T_{n,m,h_n} \frac{S_{h_n}(L^{target})}{S_{h_n}(L^{real})} \qquad \text{Eq. 7}$$

where $L^{target}$ is the target light field tensor, $L^{real}$ is the real (actually produced) light field tensor, and $S_{h_n}$ defines a special weighted summation that runs over all the indices except $h_n$. Specifically, Eqs. 8 to 10 are shown below:

$$(L^{target})_{h_1,h_2,\ldots,h_N} = L^{target}_{h_1,h_2,\ldots,h_N} \quad \text{Eq. 8}$$

$$(L^{real})_{h_1,h_2,\ldots,h_N} = \frac{1}{M}\sum_{m=1}^{M}\prod_{n=1}^{N} T_{n,m,h_n} \quad \text{Eq. 9}$$

and $$S_{h_n}(x) = \sum_{h_1,h_2,\ldots,h_{n-1},h_{n+1},\ldots,h_N} W_{h_1,h_2,\ldots,h_N} \prod_{n=1}^{N} T_{n,m,h_n} x_{h_1,h_2,\ldots,h_N} \quad \text{Eq. 10}$$

where x is either $L^{target}$ or $L^{real}$. The update rule may be intuitively understood by noting that the summations in the nominator and numerator are performed over all the light rays that go through the selected pixel. Therefore, if the real light field has values smaller than the target light field, the denominator has values smaller than the numerator, and the multiplying factor will be greater than one, which means that the pixel transmittance will grow. The weighted summation is used so that all of the light rays are considered when it is decided if the pixel transmittance should be lowered or raised. The update rule is used so that all the pixels in all the time frames of a selected SLM are updated at once, but only one display layer is changed in each update.

The update rule may be computationally expensive, but because the weighing tensor $W_{h_1,h_2,\ldots,h_N}$ is very sparse, the summation may be programmed to be performed over only the valid light rays, e.g., using the indexing as previously described. This summation may be implemented efficiently as OpenGL commands for at least some display structures.

Issues Addressed in Some Embodiments

The tensor display method may offer more freedom in selecting display structure than other multi-SLM display optimization methods. For example, refractive elements such as lenses may be placed between the layers. An arbitrary number of stacked SLMs may be used. The method, however, may have some constraints on what kind of display may be used. It may be desirable for a display to satisfy the following three conditions. First, each ray of light that leaves the backlight and exits from the front surface of the display passes each SLM at most once. Second, the SLMs modulate the intensity of the passing light multiplicatively. Finally, for each light ray that exits from the front surface of the display, there is only one optical path from the backlight that contributes to the intensity of that light ray.

One physical feature that may lower the image quality of small-scale displays is diffraction. Diffraction may not be accounted for with idealized ray rendering algorithms. The term diffraction refers to various phenomena that occur when a wave (of light) encounters an obstacle or a slit. It may be described as the bending of light around the corners of an aperture into the region of geometrical shadow. Diffraction effects may be found in all imaging systems and may not be removed even with a perfect lens design that is able to balance out all optical aberrations. In fact, a lens that is able to reach the highest optical quality is often called "diffraction limited" because most of the blurring remaining in the image comes from diffraction. The angular resolution achievable with a diffraction limited lens may be calculated from the formula $\sin\theta = 1.22 \cdot X/D$, where X is the wavelength of light and D the diameter of the entrance pupil of the lens. The same applies to, e.g., SLMs where the pixel aperture generates a diffraction pattern that causes stray light. It may be seen from the equation that the color of light and aperture size have a significant influence on the amount of diffraction.

The tensor display conditions limit the design space of displays on which image rendering may be optimized using the tensor display method. Because only one optical path is assumed to contribute to each light ray, other potential contributions to the intensity will be ignored by this optimization method. For example, it could be that due to the small size of the pixels, the light rays do not behave as perfect geometric light rays but are diffracted slightly. This may effectively cause the light rays to bend to random directions in the pixel aperture and in turn cause multiple optical paths to be present. In this case, the third condition above does not apply. Overall, the tensor display method assumes ideal light rays that e.g. do not have thickness like the real-life light beams that are generated with real life light sources and optical components. It also implicitly assumes that the light rays experience no diffraction. In many display hardware cases, this may lead to suboptimal performance due to oversimplification of the rendering optimization algorithms. Real life display systems may also exhibit some aberrations from ideal designs that are caused by, e.g., manufacturing tolerances. It may be useful for rendering algorithms to take some of these factors into account. Rendering methods that fail to account for such factors may lead to products that have a lot of performance variation, which may be a very undesirable feature in a high-volume product.

Figure 4A:
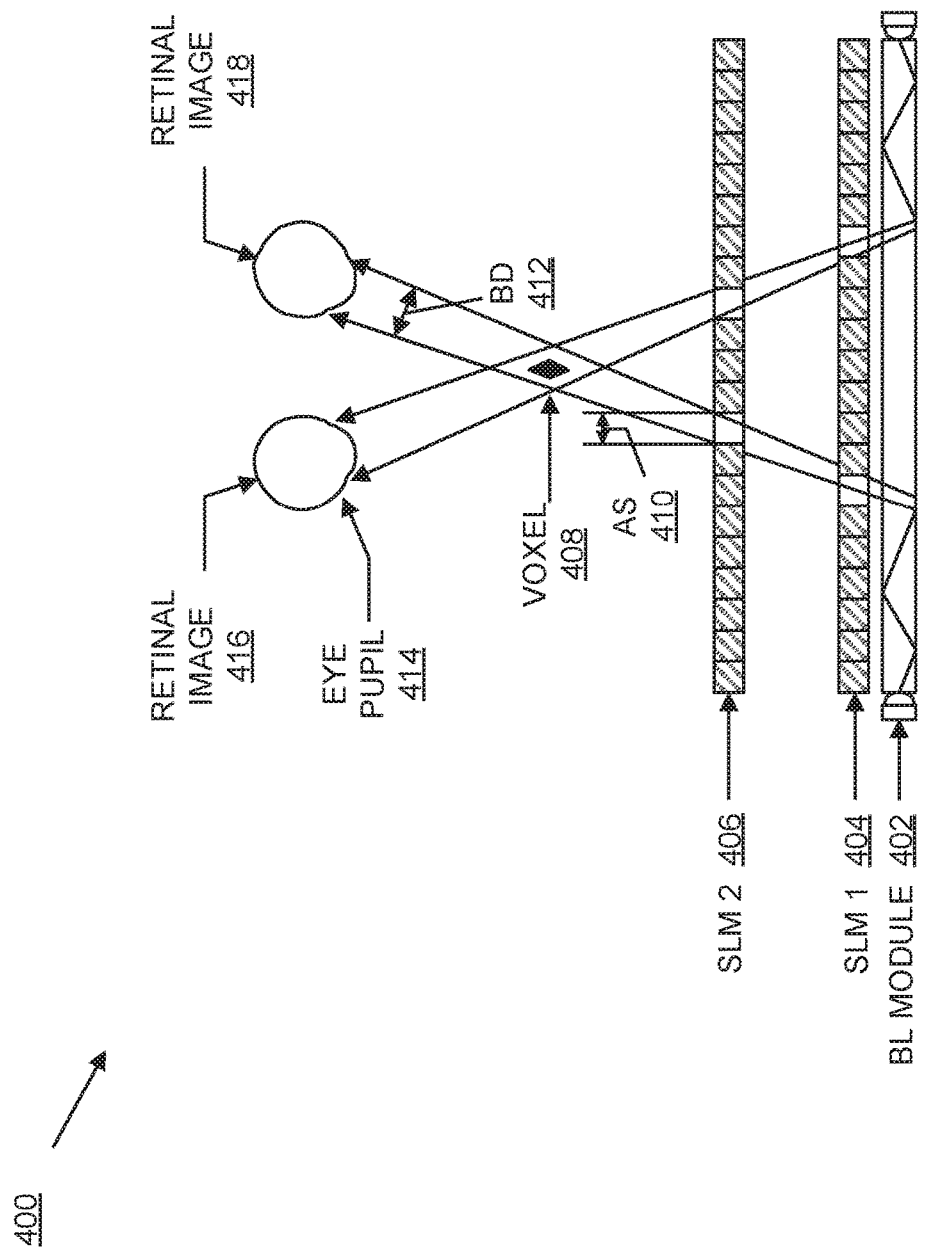
FIG. 4A is a schematic plan view illustrating an example light field display with two SLMs forming a voxel using crossing beams having a thickness and a divergence according to some embodiments.

FIG. 4A is a schematic plan view illustrating an example light field display with two SLMs forming a voxel using crossing beams having a thickness and a divergence according to some embodiments. As an example, FIG. 4A presents a display structure 400 with two stacked SLMs 404, 406 such that the tensor display method may be incompatible for sufficiently accurate image render optimization. FIG. 4A depicts a case where light emits from a backlight module 402 and a voxel 408 is formed with two crossing beams that in addition to direction have real physical properties like thickness and divergence. In the example, some of the beam divergence (BD) 412 is caused by diffraction because of the small aperture size (AS) 410 of the second SLM 406. The diverging beams have a cross-section that is not an ideal point in space, but rather a somewhat blurred spot. When this spot is imaged by the eye pupil 414 to the retina as a retinal image 416, 418, the eye pupil acts as the limiting aperture of the whole system if the beam divergence and viewing distance are large enough. The retinal image size depends on factors such as SLM pixel size and eye pupil aperture size. These factors are not accounted for by rendering optimizations calculations that assume ideal light rays.

FIG. 4B is a schematic plan view illustrating an example light field display with two SLMs forming a voxel using light ray scattering according to some embodiments. FIG. 4B presents a display structure 450 such that only one eye retinal image 452 is targeted, but due to scattering/diffraction effects 456, 458 from the multiple apertures on both SLM layers, some of the emitted light enters both eye pupils as stray light 454 that lowers contrast of the visible retinal image. This light multipath propagation is also not accounted for in the current tensor display type optimization methods.

Even if the pixel sizes are large enough for diffraction to be ignored, it may be that one would desire to include path multiplying elements, such as beam splitters on purpose, which makes the inclusion of multiple optical paths even more important.

FIG. 5A is a schematic plan view illustrating an example light field display structure with an SLM and a directional backlight according to some embodiments. Directionality for a display structure 500 may be achieved by using an array or a matrix of emitters (such as a backlight module 502) behind a microlens array (MLA) 504. By synchronizing the emitter activation of pixels on the SLM 506, two directional light rays may be generated that cross at the voxel position 508 and initiate the right eye convergence for 3D depth perception by the eyes 510. This structure could be used together with a rendering optimization algorithm similar to the tensor display approach. A benefit of this hardware approach is the increased efficiency and brightness of the display as the light is absorbed only to one SLM. A drawback of this hardware approach is the use of multiple light sources that add cost and complexity to the system. There is also a direct relation between the number of light sources and achievable angular resolution, which may lead to increasing costs in order to improve the system further.

Figure 5B:
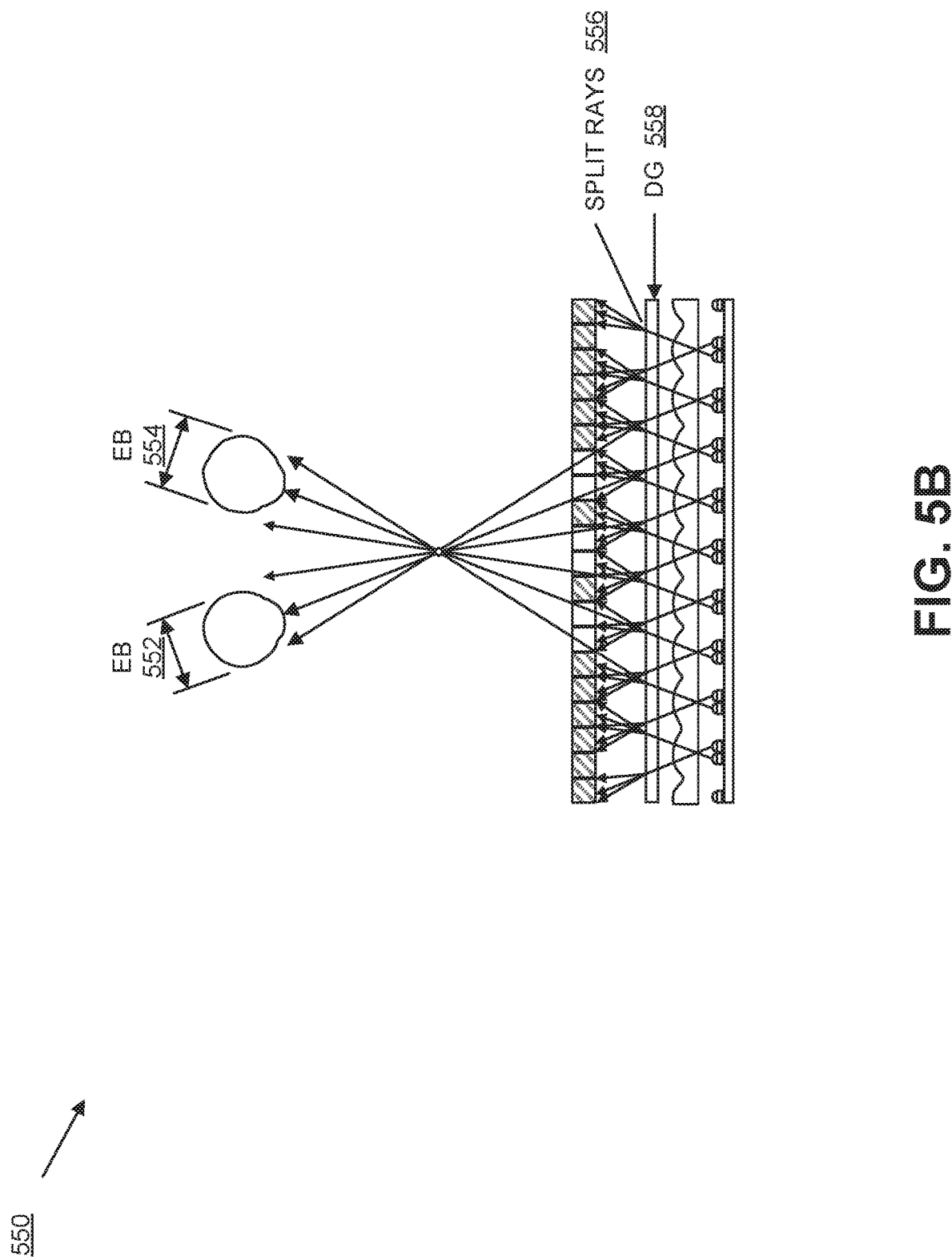
FIG. 5B is a schematic plan view illustrating an example light field display structure with an SLM, a directional backlight, and a beam-splitting element according to some embodiments.

FIG. 5B is a schematic plan view illustrating an example light field display structure with an SLM, a directional backlight, and a beam-splitting element according to some embodiments. One way to improve the directional backlight display structure 550 may include adding a diffraction grating (DG) 558 between the MLA and SLM. As shown in the example, a beam splitting element (e.g., a grating layer 558) creates directional split rays 556 from rays generated in the backlight module thereby adding more projection angles for the light rays. In some embodiments, systems and methods may be used, e.g., for initiating better retinal focus cues or for making a larger eye box (EB) 552, 554 for better usability. The multiple scattering paths in the latter presented display structure may be incompatible with the tensor display method for image rendering optimization. The optimization of multipath light propagation for such display cases may call for new image rendering techniques.

Because the light field produced by a display may have high frequency variation in intensity, a sufficiently accurate representation of the light field may call for dense sampling. In some cases, e.g., if the frequency exceeds the ability of the eye to resolve detail, the high frequency variation may not particularly affect the quality of the display. Thus, it may be useful if the optimization method does not attempt to minimize this high frequency variation at the expense of loss of other quality. If the quality of the light field is considered to be inversely proportional to the squared and integrated difference between the target light field $L^{target}(x, y, \theta, \phi)$ and the actual generated light field, the high frequency components in the light field that are not visible to the eye will contribute to this quality assessment. A more desirable quality assessment may include filtering out high frequencies before integration.

Overview of Example Rendering Systems and Methods

Figure 6A:
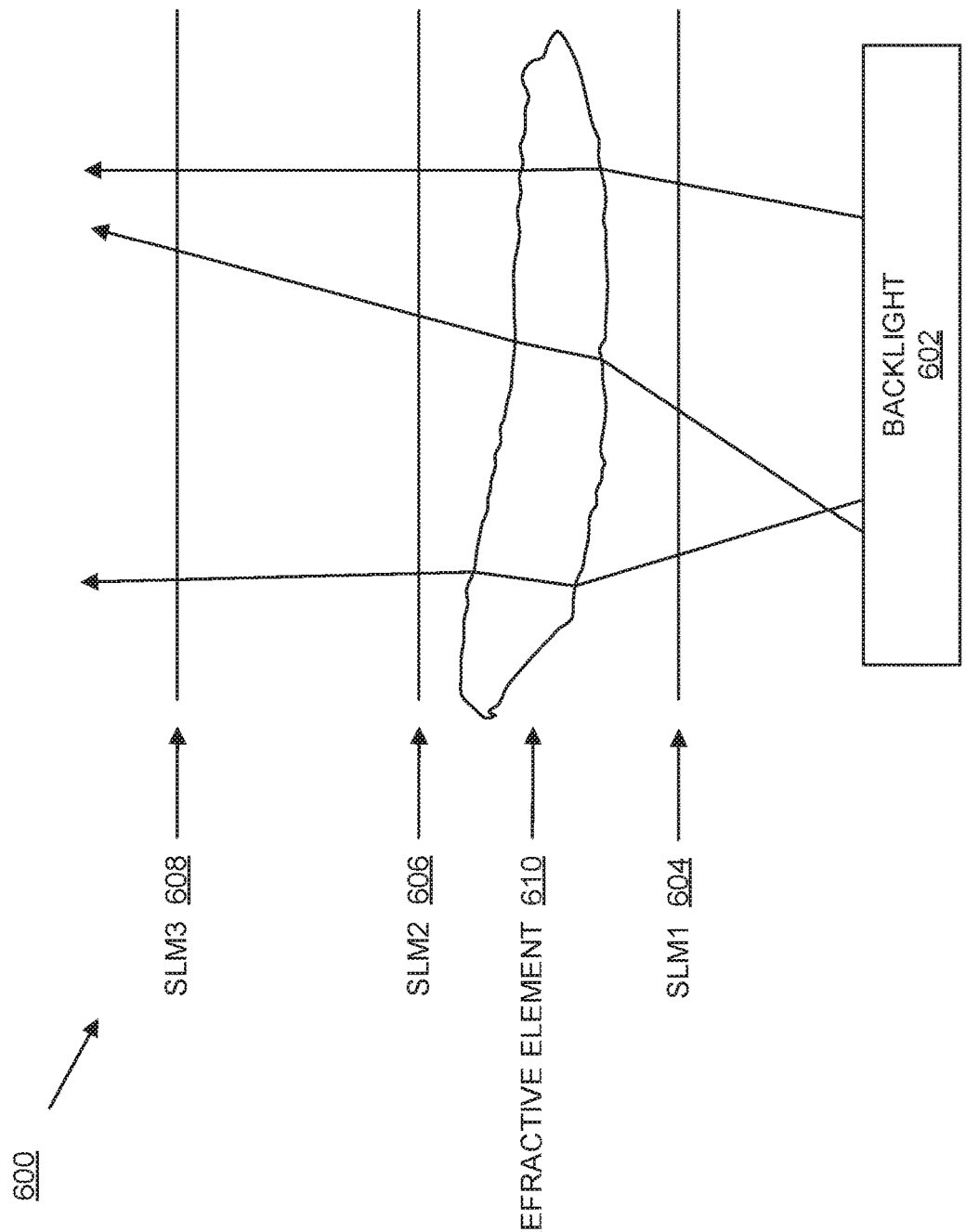
FIG. 6A is a schematic plan view illustrating an example display structure that includes a refractive element according to some embodiments.
Figure 6B:
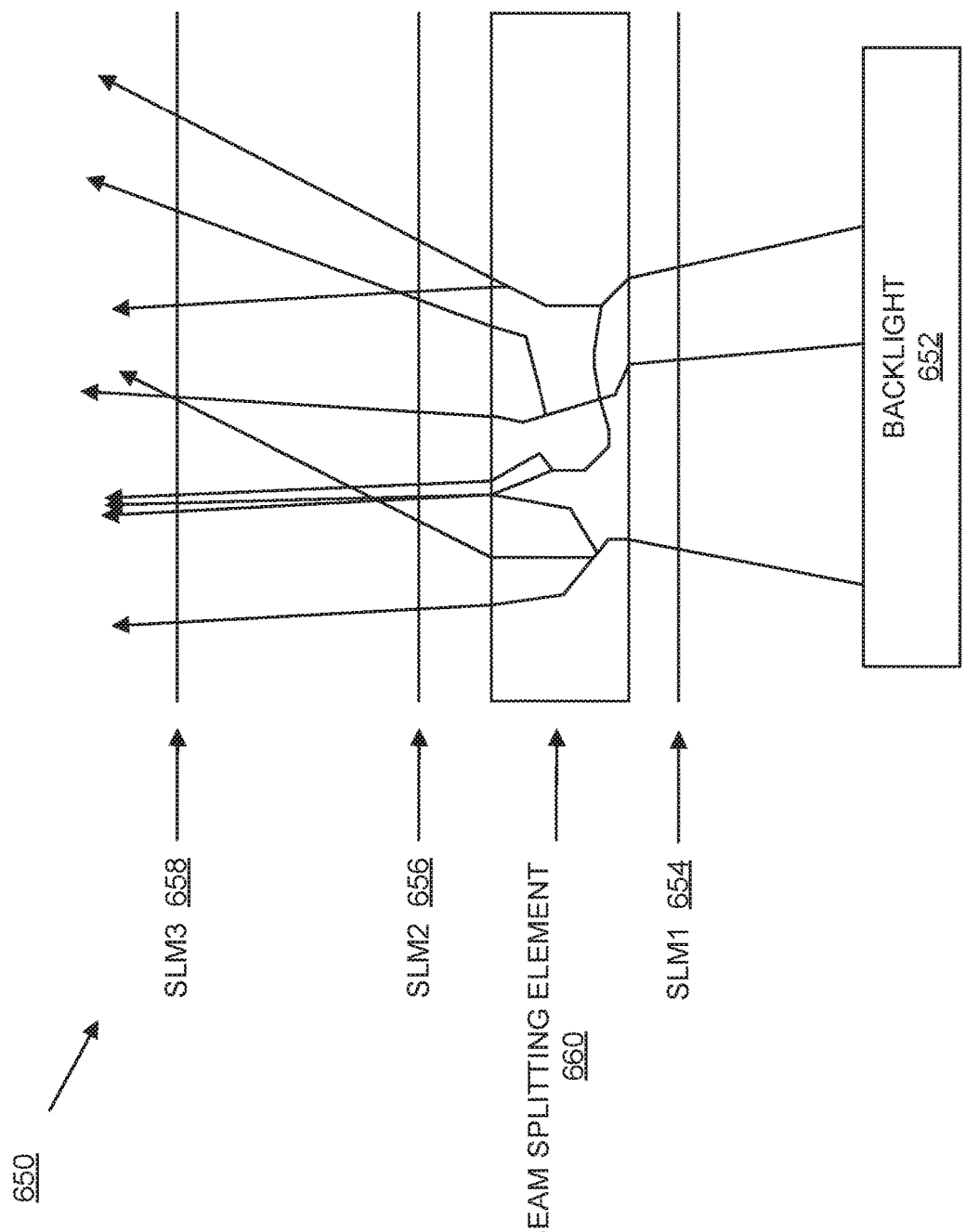
FIG. 6B is a schematic plan view illustrating an example display structure that includes a beam splitting element according to some embodiments.

In some embodiments, systems and methods improve the ability to render light fields on light field displays based on multiple optical component layers and stacked spatial light modulators. Some embodiments operate to optimize image rendering for optical display structures that exhibit real-life physical phenomena like light scattering and diffraction. Accounting for multi-path propagation and real-life beam physical properties may improve the 3D light field display image quality. Instead of requiring a single path that contributes to the luminance in a specific direction, the display is allowed to have any number of paths. As depicted in FIGS. 6A-6B, this condition enables the freedom to use beam splitting elements in the display.

FIG. 6A is a schematic plan view illustrating an example display structure that includes a refractive element according to some embodiments. FIG. 6B is a schematic plan view illustrating an example display structure that includes a beam splitting element according to some embodiments. For a display structure 600 with, e.g., a backlight 602, three SLMs 604, 606, 608, and no beam splitting (which may have a refractive element 610), there is usually only one optical path contribution to each output light ray direction. For a display structure 650 with, e.g., a backlight 652, three SLMs 654, 656, 658, and a beam splitting element 660, there may be multiple optical paths that contribute to same output light ray. For some embodiments, an apparatus may include a plurality of the internal light paths that traverse at least one beam-splitting element. For example, the beam-splitting element may be part of a backlight module or may be separate from the backlight module for some embodiments.

In some embodiments, an image rendering optimization method includes the following. An objective function of optimization is developed for displays that adhere to the multi-path display model. This objective function defines the weighted squared difference (Frobenius norm-squared) between a target light field and the actual time average light field produced by the display. The objective function is substantially minimized in order to produce an approximation of a given light field. An optimization procedure is defined for the objective function. This optimization procedure involves initiating an auxiliary objective function whose minimization is expected to also minimize the original objective function adequately. The auxiliary objective function is substantially optimized using non-negative tensor factorization (NTF).

A potential advantage of presented multi-path rendering method is that, when compared to the tensor display optimization method, this method allows more freedom in defining the structure of the display. Beam splitting elements are allowed in the display, which may be useful for multiple reasons. For example, the light output from the SLM closest to the backlight may be collimated into beams of light by a microlens array. It may be useful to split these beams of light into multiple beams in order to extend the viewing area of the display or to increase the angular or spatial density of the light field. Also, the use of diffusers is possible in the model, as they effectively multiply the paths. Additionally, this model allows the effect of diffraction to be considered in the optimization.

Very high spatial frequency variation of a light field may be undetectable by the eye. Ignoring this variation may be preferable with the multi-path method. Alternatively, two light rays that are almost parallel and overlapping may be considered to be the same. This condition may be implemented by classifying the two light rays as contributions of the same light ray in order to avoid time consuming optimization calculations.

In some embodiments, stray light propagation is accounted for in the image rendering optimization. By considering the physical beam properties, it is possible to estimate the amount of stray light generated by the real physical system generating the light beams that form voxels and retinal images. This may allow for better image optimization than rendering based on idealized ray geometry.

Example Optimization Methods

In a multi-path display, there may be multiple contributions to each light ray direction. Rather than representing the light intensity in the form of single contributions, e.g., by an expression such as $L_6=T_{1,7}T_{2,8}$, the light intensity is represented in some embodiments as a sum of many different contributions such as $L_6=T_{1,7}T_{2,8}+T_{1,9}T_{2,11}+T_{1,13}T_{2,23}$. The time multiplexed light field may thus be represented by to the following expression of Eq. 11:

$$L_i = \sum_{p=1}^{P} \frac{1}{M} \sum_{m=1}^{M} \prod_{n=1}^{N} c_{i,p} T_{n,m,f(n,p,i)} = \sum_{p=1}^{P} L_{i,p} \quad \text{Eq. 11}$$

where:
the index p enumerates the different optical paths that contribute to an emitted light ray;
$f(n, p, i)$ gives the pixel index in $n^{th}$ SLM where the $p^{th}$ path that contributes to the $i^{th}$ light ray goes through the SLM;
the index m, enumerates the multiplexed frames;
$T_{n,m,h}$ is the transmittance of pixel h in the $n^{th}$ SLM during $m^{th}$ multiplexed frame, where the index h runs from 1 to H, enumerating the pixels in the $n^{th}$ SLM; and
$c_{i,p}$, the contribution strength constant (CSC), denotes the strength of contribution the optical path p has on the light ray direction i.

The last equality reflects the contribution of the separate paths $L_{i,p}$ to an emitted ray $L_i$. The objective function is the squared difference between the target light field and the generated light field, as described by Eqs. 12 and 13:

$$f_{obj}(T) = \sum_{i=1}^{I} W_i \left( \sum_{p=1}^{P} L_{i,p} - L_i^{target} \right)^2 \quad \text{Eq. 12}$$

$$f_{obj}(T) = \sum_{i=1}^{I} W_i \left( \sum_{p=1}^{P} \frac{1}{M} \sum_{m=1}^{M} \prod_{n=1}^{N} c_{i,p} T_{n,m,f(n,p,i)} - L_i^{target} \right)^2 \quad \text{Eq. 13}$$

The value of $W_i$ is a weighting of the light rays. The weight may be selected as one for all rays. Alternatively, the weighting factor may correlate to the relative importance of the light rays if some light rays may be considered more important than others. Light rays that have the most impact on the visual experience may be given a large weight, while light rays that are less important may be given a small weight. If the weight is set to zero, the light ray is ignored by the optimization.

This object function may not be optimized with NTF. Instead, in some embodiments, the objective function is replaced with the following auxiliary objective function of Eq. 14:

$$f_{obj,auxiliary}(T) = \sum_{i=1}^{I} W_i \sum_{p=1}^{P} (L_{i,p} - d_{i,p} L_i^{target})^2 \quad \text{Eq. 14}$$

where the constants $d_{i,p}$ are selected so that $\sum_{p=1}^{P} d_{i,p}=1$ for all i. This choice causes the individual contributions $L_{i,p}$ to each have their own target values $L_{i,p}^{target}=d_{i,p}L_i^{target}$. For some embodiments, a transmittance value may be selected by substantially minimizing a sum of a plurality of error terms, each error term being a square difference between (i) a beam value partition of an exit light beam and (ii) a corresponding contribution of one of the internal optical paths. For some embodiments, a plurality of error terms may be represented as a portion of Eq. 14: $(L_{i,p}-d_{i,p}L_i^{target})^2$, such that $L_{i,p}$ is a contribution to an emitted light beam i by an internal optical path p, that $L_i^{target}$ is a target beam value for emitted light beam i, and that $d_{i,p}L_i^{target}$ is a beam value partition.

Because the constants $d_{i,p}$ define a kind of a partitioning, they may be referred to as partitioning constants. As a result, in the merit function, terms like $(L_{9,1}+L_{9,2}+L_{9,3}-L_9^{target})^2$ may be replaced by terms $(L_{9,1}-⅓L_9^{target})^2$, $(L_{9,2}-⅓L_9^{target})^2$, and $(L_{9,3}-⅓L_9^{target})^2$. Inserting the definition of $L_{i,p}$ to the above equation (Eq. 14) gives Eqs. 15 and 16:

$$f_{obj,auxiliary}(T) = \quad \text{Eq. 15}$$
$$\sum_{i=1}^{I} \sum_{p=1}^{P} W_i \left( \frac{1}{M} \sum_{m=1}^{M} \prod_{n=1}^{N} c_{i,p} T_{n,m,f(n,p,i)} - d_{i,p} L_i^{target} \right)^2$$

$$f_{obj,auxiliary}(T) = \quad \text{Eq. 16}$$
$$\sum_{i=1}^{I} \sum_{p=1}^{P} W_i c_{i,p}^2 \left( \frac{1}{M} \sum_{m=1}^{M} \prod_{n=1}^{N} T_{n,m,f(n,p,i)} - \frac{d_{i,p}}{c_{i,p}} L_i^{target} \right)^2$$

Equation 16 has a form suitable for NTF optimization. The summations over the light rays and the separate paths (index i and index p) may be merged together, so that the term $W_i c_{i,p}^2$ takes the place of the weighing factor and $$\frac{d_{i,p}}{c_{i,p}} L_i^{target}$$

becomes the new target light field. In some embodiments, the partitioning constants are initially set to be proportional to their contribution strength constants, as described by Eq. 17:

$$\frac{c_{i,1}}{d_{i,1}} = \frac{c_{i,2}}{d_{i,2}} = \ldots = \frac{c_{i,P}}{d_{i,P}} \quad \text{Eq. 17}$$

The NTF optimization may be run, which yields values for the display frames $T_{n,m,h}$. The optimization may be continued with a different choice of partitioning constants, e.g., by selecting values to achieve better results. For some embodiments, a target beam value may be partitioned into a plurality of beam value partitions, with each beam value partition being associated with a corresponding one of the internal optical paths that contributes to an emitted light beam. For some embodiments, transmittance values may be selected to substantially minimize a portion of Eq. 16, namely:

$$\sum_i^I \sum_p^P W_i c_{i,p}^2 \left( \frac{1}{M} \sum_{m=1}^M \prod_{n=1}^N T_{n,m,f(n,p,i)} - \frac{d_{i,p}}{c_{i,p}} L_i^{target} \right)^2.$$

For some embodiments, M may be set to 1 (so that frame multiplexing is not performed), and transmittance values may be selected to substantially minimize:

$$\sum_i^I \sum_p^P W_i c_{i,p}^2 \left( \prod_{n=1}^N T_{n,f(n,p,i)} - \frac{d_{i,p}}{c_{i,p}} L_i^{target} \right)^2.$$

For some embodiments, $W_i$ may be set to 1 for all values of i, and transmittance values may be selected to substantially minimize:

$$\sum_i^I \sum_p^P c_{i,p}^2 \left( \frac{1}{M} \sum_{m=1}^M \prod_{n=1}^N T_{n,m,f(n,p,i)} - \frac{d_{i,p}}{c_{i,p}} L_i^{target} \right)^2.$$

For some embodiments, M may be set to 1 (so that frame multiplexing is not performed), $W_i$ may be set to 1 for all values of i, and transmittance values may be selected to substantially minimize:

$$\sum_i^I \sum_p^P c_{i,p}^2 \left( \prod_{n=1}^N T_{n,f(n,p,i)} - \frac{d_{i,p}}{c_{i,p}} L_i^{target} \right)^2.$$

For some embodiments, determining a target beam value for an emitted light beam may be based on information characterizing the light field. For some embodiments, selecting a transmittance value may be performed using non-negative tensor factorization (NTF) (or NTF optimization). For some embodiments, each partitioning constant $d_{i,p}$ may be selected to be proportional to a corresponding contribution strength constant $c_{i,p}$.

Example Implementations

As a starting point, a multi-SLM display is provided, and a certain light field is intended to be reproduced. The light field is assumed to be given as a set of light ray directions and the associated intensities and weights for each direction.

In a computer system used to perform the optimization, the display may be represented as a display structure definition, a type of data structure. The display structure definition may include, for example, a description of how many SLMs the display structure includes, how many pixels are in each SLM, and how many time multiplexed frames may be used. Given a light ray direction, the display structure definition may also contain information to determine the optical paths that contribute to the light intensity in the given direction. Here, an optical path is described by the passing points (pixel indices) where the light ray passes each SLM. The contribution strength constants of each optical path may be provided.

Figure 7:
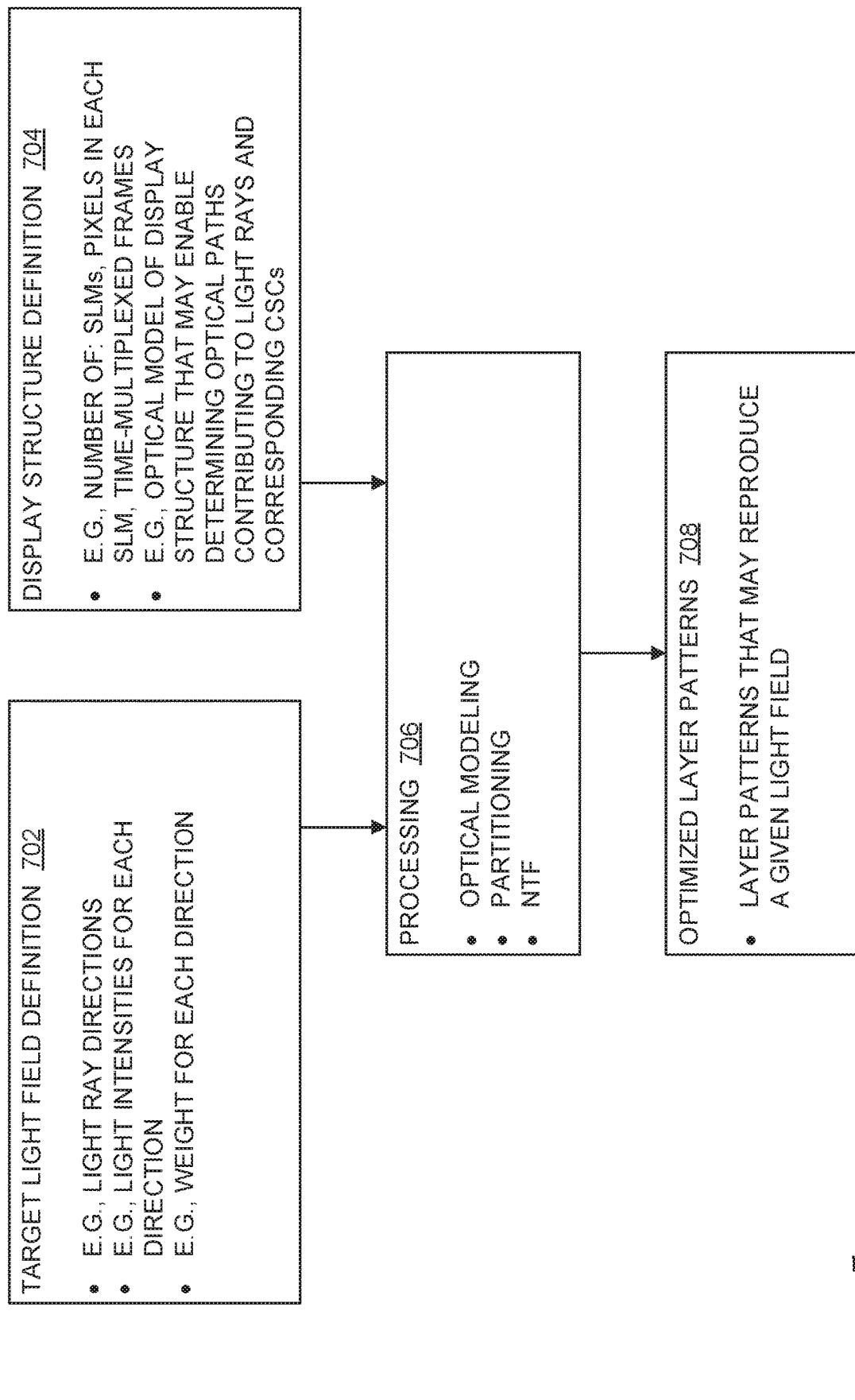
FIG. 7 is a flowchart illustrating an example optimization process according to some embodiments.

FIG. 7 is a flowchart illustrating an example optimization process according to some embodiments. The process 700 takes as input the target light field definition 702 and the display structure definition 704 and produces the optimized layer patterns 708.

The optimization processing 706 may include optical modelling. In the optical modelling, the display structure definition may be used to find all the optical paths (along with the contribution strength constants), that contribute to the light rays given in the target light field. The optical model may include information used to identify where the light rays pass the SLMs.

An example process may further include partitioning. In the partitioning, the partitioning constants are defined for the contributing optical paths. It may be preferable to set the partitioning constants proportional to the corresponding contribution strength constants, as previously described.

The example optimization process may further include performing a weighted NTF optimization on the optimization problem defined by the partitioning. For example, an iterative method as described in Wetzstein, et al. (2012) may be used. Before the iteration, the pixel transmittances may be initialized to some value (e.g., 0.5 transmittance for all pixels). For some embodiments, based at least in part on the beam value partitions, a transmittance value may be selected for at least one controllable-transparency pixel along at least one of the internal optical paths that contributes to an emitted light beam.

The most computationally demanding process may be the NTF, since the other processes may be computationally cheaper (e.g., the partitioning) or may be partly done in advance (e.g., the optical modelling). In some embodiments, the iterative scheme described in Wetzstein, et al. (2012) may be implemented by having two accumulator arrays that correspond to all the pixels on a given SLM layer. In the beginning of an update, these accumulator arrays may be initialized to zero, and an iteration over all the light rays may be used to accumulate the array values. If multiple optical paths are used, each of these contributions correspond to a "light ray" in the iteration. Therefore, if the number of optical paths (P) is increased from 1 (the number of paths for the tensor display method) to, for example, 4, the number of iterations is also increased 4-fold. Therefore, the computational load may be considered to be proportional to P. Since the tensor display method (P=1) has reached interactive refresh rates, the multipath method may produce similar update speeds.

The iterative NTF optimization may allow for parallelization. When the light rays are iterated over to accumulate the arrays, the set of light rays may be divided into multiple smaller sets, which are iterated over in separate computational units. Each of these computational units has their own accumulation arrays, which are combined to get the final result.

In some embodiments, the output rays are allowed to have multiple contributions from different optical paths that each have their own contribution strengths, which are described by the contribution strength constants. The partitioning may allow a weighted NTF optimization to be used for displays with multiple contributions. In some embodiments, ray merging may be used in conjunction with the scheme presented here, effectively allowing a denser sampling of a light field to be used in the optical modelling than in the actual optimization. Some embodiments may include repartitioning, as discussed below in the section entitled "Continued Iteration."

Example Display Hardware

Disclosed methods may be used together with several different display hardware configurations. The disclosed methods allow image rendering with displays that utilize light multipath propagation unlike, e.g., the tensor display method that only deals with single path propagation.

Figure 8A:
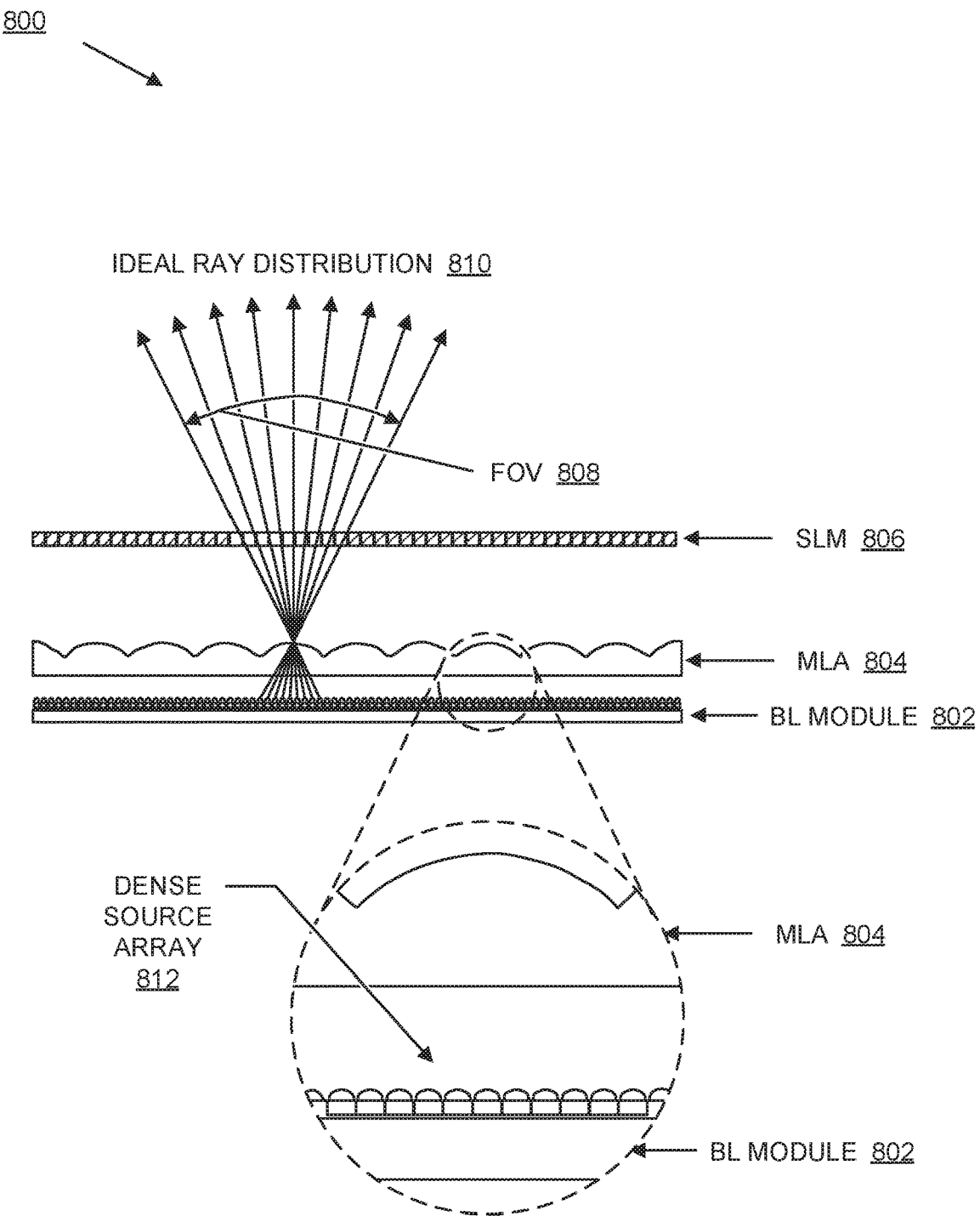
FIG. 8A is a schematic plan view illustrating an example display structure based on single path propagation according to some embodiments.
Figure 8B:
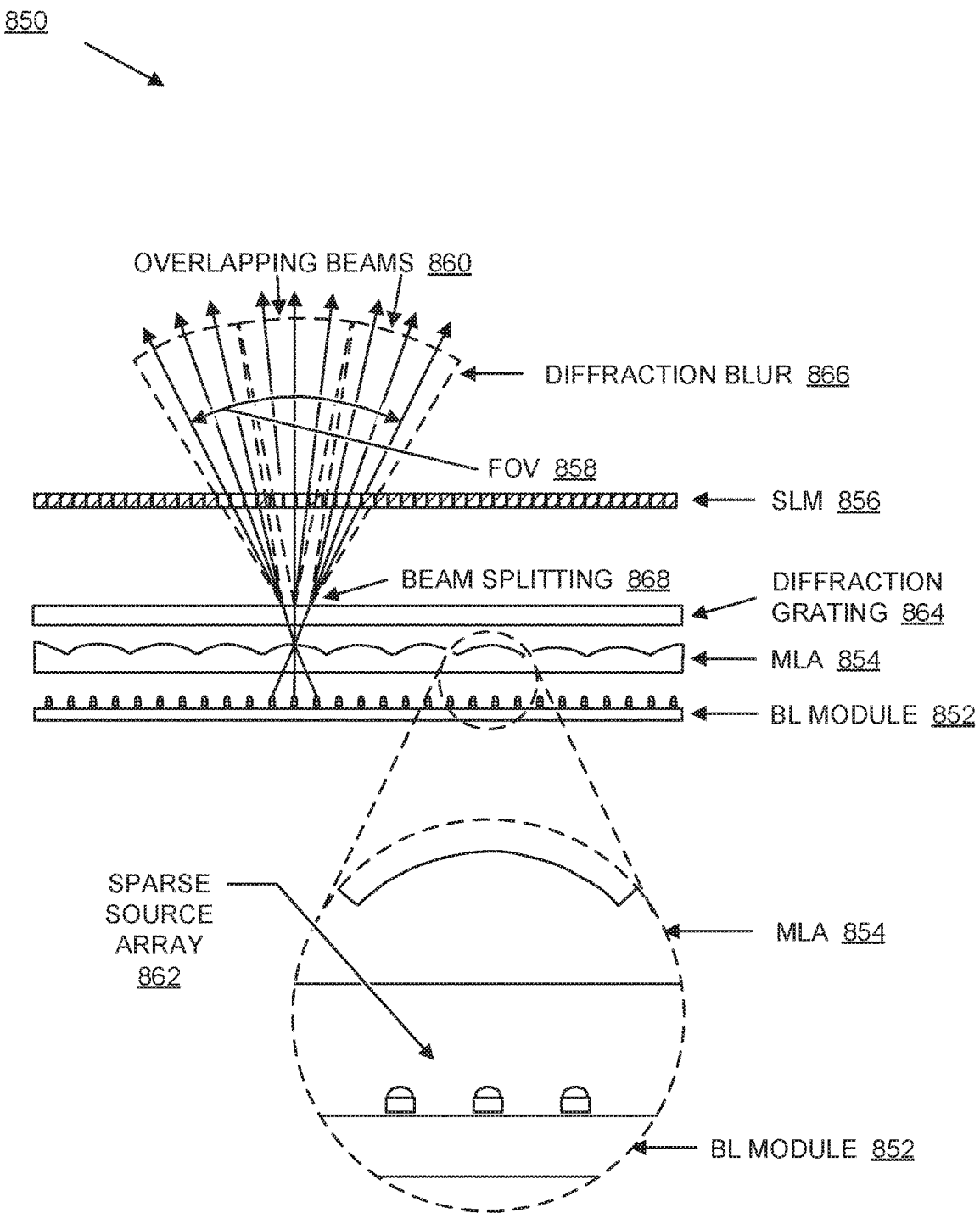
FIG. 8B is a schematic plan view illustrating an example display structure based on multipath propagation according to some embodiments.

FIG. 8A is a schematic plan view illustrating an example display structure based on single path propagation according to some embodiments. FIG. 8B is a schematic plan view illustrating an example display structure based on multipath propagation according to some embodiments. In order to clarify the difference between these two display structures 800, 850, FIG. 8A presents a directional backlight display structure 800 that may make use of the tensor display method, whereas FIG. 8B shows a structure 850 such that the image may be rendered with a multipath image rendering method.

The display structures illustrated in FIG. 8A and FIG. 8B each include a backlight (BL) module 802, 852 that includes an array of separately controlled light sources. Emitted light may be collected and collimated with microlens arrays (MLA) 804, 854 into directional beams that illuminate the back of spatial light modulators (SLM) 806, 856. The sources may include, e.g., pLEDs and the SLMs 806, 856 may be, e.g., LCD panels. In both cases, the combination of the BL module 802, 852 and MLA 804, 854 may be used for creating directional backlights. Multiview display systems may be formed by synchronizing the SLM pixel patterns to the sequential activation of a group of specific sources that produce the illumination to a specific direction.

In the single path display, each source creates one ideal directional ray or beam. This means that the BL module 802 may call for as many separate sources under each microlens as there are views. The multipath display 850 includes an added diffraction grating 864 after the MLA 854. The diffraction grating 864 performs beam splitting 868, splitting each beam into three separate child-beams that propagate to slightly different directions. In addition, some diffraction blur 866 is created around the ideal ray directions, as it may be reasonably assumed that a real-life diffractive component scatters some of the light outside the intended orders. Some parts of the blurred beams may be overlapping beams 860, creating a situation where multiple light propagation paths exist. These overlapping beam paths are taken into account in the image rendering calculations, as they are summed up and increase light intensity emitted to each direction. This task may not be performed with the tensor display method that assumes only single path propagation.

With suitable arrangement of the MLA 804, 854, diffraction grating 864 and SLM 806, 856, the same field of view (FOV) 808, 858 and number of view directions created with the single path structure may also be created with the multipath display. However, the multipath case, may call for only one third the number of separate source components that single path display case calls for. This means the single path display structure 800 may use a densely packed source array 812, whereas the multipath display structure 850 may use a sparsely packed array 862. In some embodiments, cost savings may be achieved with the multipath hardware structure as fewer active components with control electronics and assembly are used in the BL module.

For some embodiments, the backlight (BL) module includes multiple individually-controllable light sources, which may be arranged as an addressable array of light-emitting elements. The backlight modules 802, 852 are examples of such arrays of light-emitting elements. In some such embodiments, the luminance of the individual light-emitting elements may be selected using an auxiliary objective function according to techniques as describe herein. For example, the light output of an individual light-emitting element during multiplexed frame m may be represented by $T_{0,m,f(0,p,i)}$, where $f(0, p, i)$ is an index of a light-emitting element (considered here to be in layer zero) at the beginning of internal optical path p to emitted light beam i. In some such embodiments, the light output of the light-emitting elements and the transparency of the controllable-transparency pixels may be jointly selected to substantially minimize the value of the following expression $$\sum_{i=1}^{I} \sum_{p=1}^{P} W_i c_{i,p}^2 \left( \frac{1}{M} \sum_{m=1}^{M} \prod_{n=0}^{N} T_{n,m,f(n,p,i)} - \frac{d_{i,p}}{c_{i,p}} L_i^{target} \right)^2,$$

wherein: i is an index over emitted light beams; p is an index over internal optical paths; $W_i$ is a weighting associated with respective light beam i (in some embodiments, $W_i \equiv 1$); $c_{i,p}$, is a contribution strength constant proportional to a contribution of internal optical path p to exit light beam i; M is a number of multiplexed frames (in some embodiments, M=1); m is an index over multiplexed frames; N is a number of layers of controllable-transparency pixels; n is an index over layers, where n=0 represents a layer of light-emitting elements and values of n>0 represent layers of controllable-transparency pixels; $f(n, p, i)$ is an index of a controllable-transparency pixel (or light-emitting element, for layer zero) in layer n along internal optical path p to emitted light beam i; $T_{n,m,f(n,mi)}$ is a transmittance value (or luminance value, in layer zero) of a controllable-transparency pixel $f(n, p, i)$ in layer n during multiplexed frame m; $d_{i,p}$ is a partitioning constant; and $L_i^{target}$ is a target beam value for emitted light beam i.

The use of individually-controllable light sources can allow for a display with a reduced number of layers of controllable-transparency pixels. For example, some embodiments may include a single layer of light-emitting elements and a single layer of controllable-transparency pixels.

Continuous Distribution of Optical Paths

Some display structures may produce a continuous distribution of possible optical paths. For example, it may be that after passing a small aperture, a light ray may be considered to select a random direction according to some probability distribution function. In this case, it may be helpful to assume that from the optimization point of view, only the paths which define a different ordered set of pixels may be considered different. The number of optical paths like this may be large but will be finite. To reduce the computational load, paths that are known to have little effect may be ignored.

Continued Iteration

In some embodiments, the optimization method includes repartitioning. In the event that the initially selected partitioning unnecessarily constrains the layer patterns, the partitioning may be performed again and the NTF optimization repeated with that partitioning. For example, it may be assumed that after the NTF optimization, the light contributions for the $i^{th}$ ray are described by the following equation, Eq. 18:

$$L_i = L_{i,1} + L_{i,2} \qquad \text{Eq. 18}$$

where $L_{i,1}=4.1$ and $L_{i,2}=8.1$ and the values targeted by the optimization are $L_{i,1}^{target}=6.0$ and $L_{i,2}^{target}=6.0$. Therefore the targeted total intensity is $L_i^{target}=L_{i,1}^{target}+L_{i,2}^{target}=12.0$. Because only the total intensity is observed by the viewer, the target intensities may instead be set to $L_{i,1}^{target}=4.0$ and $L_{i,2}^{target}=8.0$, which give the same targeted value for the total intensity. These values are also closer to the actual values produced by the optimization, so that when the NTF algorithm is run again, the objective function changes less strongly with variation of the pixel transmittances. This means that in the optimization, the pixel transmittances may be allowed to move more freely and therefore better accommodate intensity tuning for some other light ray.

Ray Merging

If the light field produced by the display has a very fine structure, e.g., when one of the ray co-ordinates $(x,y,\theta,\varphi)$ are varied, the light intensity may vary greatly. If the light field is sampled at a lower spatial frequency than this variation, aliasing effects may be visible in the produced light field. This effect may be taken into account in the optical modelling. The selected light rays in the target light field may be considered to each represent a range of light rays, and therefore when calculating the contributions to a light ray intensity, all optical paths that contribute to a specific range of light rays may be taken into account using techniques adapted from multisampling antialiasing to calculate the contribution strength constants. More appropriate values for the contribution strength constants (CSCs) may be obtained by this multisampling. This process may be visualized as rays merging, by imagining that multiple "narrow" light rays that cover some range in the light ray co-ordinate space, are merged into a single "thick" light ray. This method does not necessarily increase the computational load, since the CSC computation may be based on fitted analytic functions or a lookup table, for example.

This kind of ray merging may also be used to take into account the limited accuracy of the eye. If the display may produce such fine detail and narrow rays that this detail would go unnoticed to the human eye, these rays may be merged and not optimized separately.

Reducing the Effect of Stray Light Due to Diffraction

For a multilayered display, pixels may be small enough to cause noticeable diffraction. Accordingly, when a narrow beam of light is incident on the pixel aperture, the rays may be bent according to some distribution function. If this effect is ignored in rendering to the display, the quality of the produced light field may deteriorate. In some embodiments, multipath rendering method may counter this deterioration.

Figure 9:
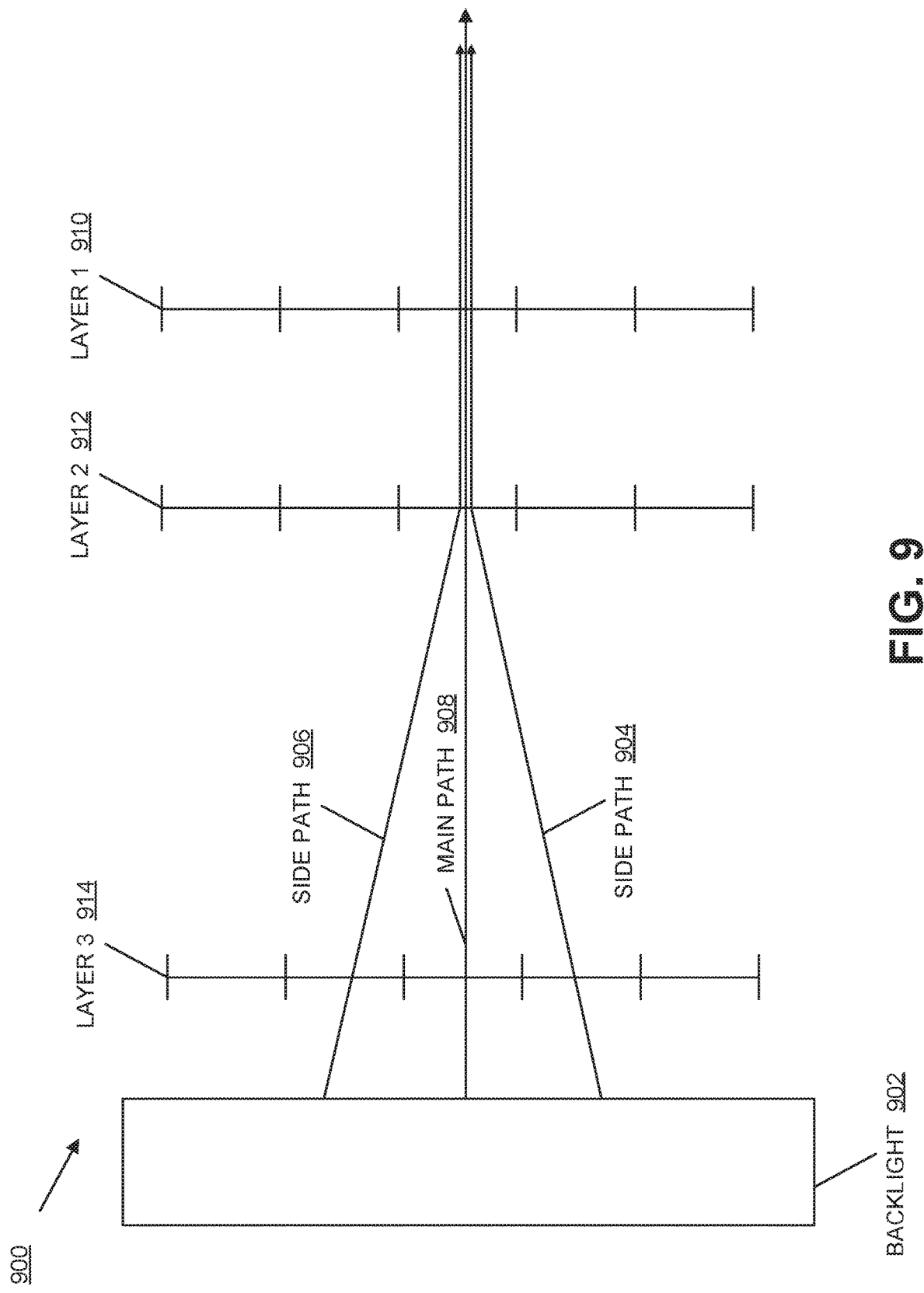
FIG. 9 is a schematic plan view illustrating an example of diffraction generating multiple paths according to some embodiments.

FIG. 9 is a schematic plan view illustrating an example of diffraction generating multiple paths according to some embodiments. Because light rays bend at the small aperture (pixel) in the second layer 912, there are, in addition to the main path 908, two additional side paths 904, 906 that bring a small contribution to the light ray intensity.

As illustrated in the example, a display 900 includes a backlight 902 and three SLM layers 910, 912, 914, each having some number of pixels. As shown in the example, the light rays bend at the second layer 912, so that most light continues straight, but a small part (e.g., 10%), bends enough that it may be considered to come from the neighboring pixels of layer 3 (914). This mock display 900 may be used to demonstrate the multipath optimization method.

To test the multipath method, computer models of a display were constructed. The simulated displays had 3 SLMs, with each having 20 pixels and 4 time-multiplexed frames. The target light field was defined as 100 light rays with randomly selected intensity from range [0, 0.1], with each light ray having equal weight. The light rays were assigned three paths, one main path with contribution strength constant 1 and two side paths with contribution strength constants ranging between 0.01 and 1.0. The display transmittances were initialized to value 0.5 for all pixels in all frames.

Three different optimization methods were used to optimize the frames. The three methods will be called "singlepath", "multipath-even", and "multipath-balanced". In the singlepath method, the side paths were ignored, resulting effectively to the tensor display method. In the multipath-even method, the multipath method is used, and the partitioning constants are set equal. In the multipath-balanced method, the partitioning constants are set proportional to the contribution strength constants, as suggested earlier. The used weighted NTF algorithm was the algorithm described in Wetzstein, et al. (2012) with total of 50 iterations, which seemed to be enough to get converged results, as is demonstrated in FIG. 10.

FIG. 10 is a line graph illustrating a convergence for each of three optimization methods according to some embodiments. FIG. 10 is a graph 1000 illustrating a convergence at an iteration value 1004 of an objective function value 1002 for each of three different optimization methods (objective, multipath-balanced method 1006; objective, singlepath method 1008; and objective, multipath-even method 1010). For this simulation, the side path contribution strength constants were set to 0.1.

Figure 11:
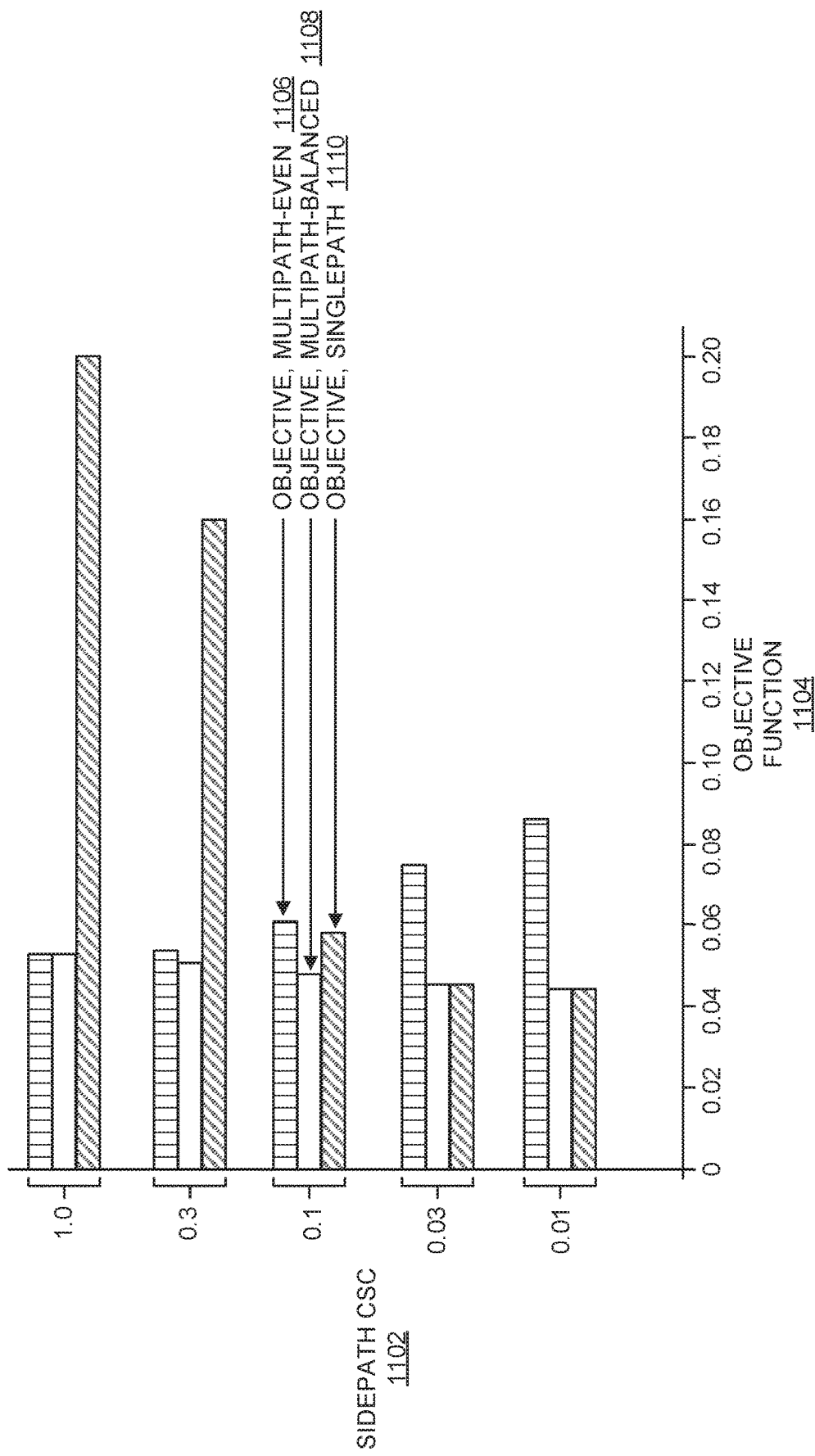
FIG. 11 is a bar graph comparing the performance of three optimization methods according to some embodiments.

FIG. 11 is a bar graph comparing the performance of three optimization methods according to some embodiments. The numbers on the y-axis correspond to the sidepath contribution strength constants (CSC) 1102. The largest bar extends outside of the figure. As shown in the graph of performance of optimization methods 1100, it is seen that the multipath-even method 1106 gives the best performance for the objective function 1104 in all tested cases. Comparing the singlepath method 1110 to the multipath-balanced method 1108, the singlepath method 1110 performs as well as the multipath-balanced method 1108 if the sidepath CSCs 1102 go to zero. If the sidepath CSC 1102 is increased, the singlepath method 1110 has increasingly poor performance, as it is forced to ignore an increasingly large contribution to the light field. Comparing the multipath-even method 1106 to the multipath-balanced method 1108, the two models perform the same if the sidepath CSCs are set to 1.0. This is expected, as the two models define the same partitioning at that point. If the sidepath CSCs 1102 are lowered, however, the performance of multipath-even method 1106 is strongly weakened, compared to multipath-balanced method 1108. Comparing the singlepath method 1110 and the multipath-even method 1106, which method performs better depends on the situation. For example, completely ignoring the sidepaths is sometimes better than multipath-even, which shows that multipath-even may not be an optimal choice.

In conclusion, this example in FIG. 11 demonstrates that the multipath method may in some situations reduce the impact of unwanted stray light in multi-SLM displays, and that the choice of setting the partitioning constants proportional to the CSCs may be helpful. It was also shown that the method works with multiple paths of similar relative strength.

Additional Embodiments

An example method of operating a display device in which a plurality of internal light paths contribute to each respective output beam in accordance with some embodiments may include: partitioning a target beam value $L_i^{target}$ of each respective output beam i into plurality of partitioned beam values $d_{i,p} L_i^{target}$, wherein each partitioned beam value $d_{i,p}L_i^{target}$ is associated with a respective one i, p of the internal light paths contributing to the output beam i, and wherein each of the internal light paths traverses at least one controllable-transparency pixel of the display device; and selecting a respective transmittance value T for each of a plurality of pixels in the display device, wherein the selection is made to substantially minimize a total error between each partitioned beam value $d_{i,p}L_i^{target}$ and the contribution of the associated light path i, p to the output beam i.

For some embodiments of the example method, the target beam values $L_i^{target}$ may represent a target light field.

For some embodiments of the example method, the contribution of the associated light path i, p to the output beam i may be represented as $$\frac{1}{M}\sum_{m=1}^{M}\prod_{n=1}^{N}c_{i,p}T_{n,m,f(n,p,i)}.$$

For some embodiments of the example method, the total error may be represented as $$\sum_{i=1}^{I}\sum_{p=1}^{P}W_i\left(\frac{1}{M}\sum_{m=1}^{M}\prod_{n=1}^{N}c_{i,p}T_{n,m,f(n,p,i)}-d_{i,p}L_i^{target}\right)^2.$$

For some embodiments of the example method, selecting a respective transparency value T for each of a plurality of pixels may be performed using non-negative tensor factorization (NTF).

For some embodiments of the example method, each of the internal light paths may further traverse at least one beam-splitting element.

For some embodiments of the example method, each of the internal light paths may further traverse at least one diffraction grating.

For some embodiments of the example method, each of the internal light paths may traverse at least two controllable-transparency pixels of the display device.

For some embodiments of the example method, the display device may further include a backlight module.

For some embodiments of the example method, the display device may further include a light-emitting layer.

For some embodiments of the example method, a value of each partitioning constant $d_{i,p}$ may be selected based on a corresponding contribution strength constant $c_{i,p}$.

For some embodiments of the example method, a value of each partitioning constant $d_{i,p}$ may be selected to be proportional to a corresponding contribution strength constant $c_{i,p}$.

Some embodiments of the example method may further include operating the display using the selected transparency values T.

Another example method of producing a light field in accordance with some embodiments may include: determining an optical model of a multilayer spatial light modulator (SLM) display comprising a plurality of independent light modulating pixels; partitioning an objective function to allow for non-negative tensor factorization (NTF) optimization; and altering the light modulation characteristics of independent light modulating pixels using time multiplexed frames to generate voxels of the light field.

For some embodiments of another example method, determining the optical model may include determining optical paths and corresponding contribution strength constants of light rays contributing to the target light field.

Some embodiments of another example method may further include calculating partitioning constants, wherein altering the light modulation characteristics of independent light modulating pixels may be based at least in part on the calculated partitioning constants.

An example system apparatus in accordance with some embodiments may include: a processor and a non-transitory computer-readable medium storing instructions operative to perform any of the methods listed above.

Another example display device apparatus in accordance with some embodiments may include: a sparse light emitting element array; a collimating optical layer; a diffraction grating layer overlaying the collimating optical layer; the diffraction grating layer operative to split beams of light into a plurality of beam sections; and a spatial light modulator operative to provide control over the transmission of beam sections from the diffraction layer to outside the display device.

Note that various hardware elements of one or more of the described embodiments are referred to as "modules" that carry out (perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (e.g., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method, for image rendering on a display device comprising one or more spatial light modulators including controllable-transparency pixels, comprising:
   determining target beam values for exit light beams emitted from respective locations on the front surface of the display device, each of the exit light beams is formed by contributions from lights propagating along corresponding internal optical paths, each of the internal optical paths passes through at least one of the controllable-transparency pixels;
   for each of the exit light beams, partitioning the respective target beam value into beam value partitions, wherein each of the beam value partitions being associated with a corresponding one of the internal optical paths; and selecting transmittance values for the controllable-transparency pixels so that a sum of error terms is minimized, wherein an error term represents a difference between (i) a contribution from light propagating along an internal optical path to one of the exit light beam and (ii) a beam value partition associated with that internal optical path, and wherein the error term is represented as:

$$(L_{i,p} - d_{i,p} L_i^{target})^2,$$

wherein $L_{i,p}$ is a contribution to an exit light beam i by an internal optical path p, wherein $L_i^{target}$ is a target beam value for an exit light beam i, and target is a beam value partition associated with an internal optical path p wherein $d_{i,p} L_i^{target}$ is a beam value partition associated with an internal optical path p that contributes to an exit light beam i.

2. The method of claim 1, wherein the selecting of the transmittance values comprises iteratively adjusting the transmittance values to reduce the sum of the error terms.

3. The method of claim 1, wherein $L_{i,p}$ is a product of factors comprising a contribution strength constant $c_{i,p}$ and at least one transmittance value of at least one controllable-transparency pixel located along the optical path p.

4. The method of claim 3, wherein a value of each partitioning constant $d_{i,p}$ is selected based on a corresponding contribution strength constant $c_{i,p}$.

5. The method of claim 4, wherein a value of each partitioning constant $d_{i,p}$ is selected to be proportional to a corresponding contribution strength constant $c_{i,p}$.

6. The method of claim 1, wherein the selecting of the transmittance values comprises selecting transmittance values that substantially minimize the value of the following expression $$\sum_{i=1}^{I} \sum_{p=1}^{P} W_i c_{i,p}^2 \left( \frac{1}{M} \sum_{m=1}^{M} \prod_{n=1}^{N} T_{n,m,f(n,p,i)} - \frac{d_{i,p}}{c_{i,p}} L_i^{target} \right)^2$$

wherein:
 i is an index over exit light beams;
 p is an index over internal optical paths;
 $W_i$ is a weighting associated with respective light beam i;
 $c_{i,p}$ is a contribution strength constant proportional to a contribution of internal optical path p to exit light beam i;
 M is a number of multiplexed frames;
 m is an index over multiplexed frames;
 N is a number of layers of controllable-transparency pixels;
 n is an index over controllable-transparency pixel layers;
 $f(n, p, i)$ is an index of a controllable-transparency pixel in layer n, the pixel is located along internal optical path p that contributes to an exit light beam i;
 $T_{n,m,f(n,p,i)}$ is a transmittance value of a controllable-transparency pixel $f(n, p, i)$ in layer n during multiplexed frame m;
 $d_{i,p}$ is a partitioning constant; and
 $L_i^{target}$ is a target beam value for an exit light beam i.

7. The method of claim 1, wherein the selecting of the transmittance values comprises selecting transmittance values that substantially minimize the value of the following expression $$\sum_{i=1}^{I} \sum_{p=1}^{P} c_{i,p}^2 \left( \prod_{n=1}^{N} T_{n,f(n,p,i)} - \frac{d_{i,p}}{c_{i,p}} L_i^{target} \right)^2,$$

wherein:
 i is an index over exit light beams;
 p is an index over internal optical paths;
 $c_{i,p}$ is a contribution strength constant proportional to a contribution of internal optical path p to exit light beam i;
 N is a number of layers of controllable-transparency pixels;
 n is an index over controllable-transparency pixel layers;
 $f(n, p, i)$ is an index of a controllable-transparency pixel in layer n, the pixel is located along internal optical path p that contributes to an exit light beam i;
 $T_{n,f(n,p,i)}$ is a transmittance value of a controllable-transparency pixel $f(n, p, i)$ in layer n;
 $d_{i,p}$ is a partitioning constant; and
 $L_i^{target}$ is a target beam value for an exit light beam i.

8. The method of claim 1, wherein the selecting of the transmittance values comprises selecting transmittance values that substantially minimize the value of the following expression $$\sum_{i=1}^{I} \sum_{p=1}^{P} W_i c_{i,p}^2 \left( \prod_{n=1}^{N} T_{n,f(n,p,i)} - \frac{d_{i,p}}{c_{i,p}} L_i^{target} \right)^2,$$

wherein:
 i is an index over exit light beams;
 p is an index over internal optical paths;
 $W_i$ is a weighting associated with respective light beam i;
 $c_{i,p}$ is a contribution strength constant proportional to a contribution of internal optical path p to exit light beam i;
 N is a number of layers of controllable-transparency pixels;
 n is an index over controllable-transparency pixel layers;
 $f(n, p, i)$ is an index of a controllable-transparency pixel in layer n, the pixel is located along internal optical path p that contributes to an exit light beam i;
 $T_{n,f(n,p,i)}$ is a transmittance value of a controllable-transparency pixel $f(n, p, i)$ in layer n;
 $d_{i,p}$ is a partitioning constant; and
 $L_i^{target}$ is a target beam value for an exit light beam i.

9. The method of claim 1, wherein the selecting of the transmittance values comprises selecting transmittance values that substantially minimize the value of the following expression $$\sum_{i=1}^{I} \sum_{p=1}^{P} c_{i,p}^2 \left( \frac{1}{M} \sum_{m=1}^{M} \prod_{n=1}^{N} T_{n,m,f(n,p,i)} - \frac{d_{i,p}}{c_{i,p}} L_i^{target} \right)^2,$$

wherein:
i is an index over exit light beams;
p is an index over internal optical paths;
$c_{i,p}$ is a contribution strength constant proportional to a contribution of internal optical path p to exit light beam i;
M is a number of multiplexed frames;
m is an index over multiplexed frames;
N is a number of layers of controllable-transparency pixels;
n is an index over controllable-transparency pixel layers;
$f(n, p, i)$ is an index of a controllable-transparency pixel in layer n, the pixel is located along internal optical path p that contributes to an exit light beam i;
$T_{n,m,f(n,p,i)}$ is a transmittance value of a controllable-transparency pixel $f(n, p, i)$ in layer n during multiplexed frame m;
$d_{i,p}$ is a partitioning constant; and
$L_i^{target}$ is a target beam value for an exit light beam i.

10. The method of claim 1, wherein the determining of the target beam value for the exit light beam is based on information characterizing a light field.

11. The method of claim 1, wherein the selecting of the transmittance values is performed using non-negative tensor factorization (NTF).

12. The method of claim 1, further comprising, based at least in part on the beam value partitions, selecting a light output for at least one light-emitting element at a beginning of at least one of the internal optical paths.

13. An apparatus comprising:
a display device comprising one or more spatial light modulators including controllable-transparency pixels; and
a processor configured to perform image rendering on the display device including at least:
determining target beam values for exit light beams emitted from respective locations on the front surface of the display device, each of the exit light beams is formed by contributions from lights propagating along corresponding internal optical paths, each of the internal optical paths passes through at least one of the controllable-transparency pixels,
for each of the exit light beams, partitioning the respective target beam value into beam value partitions, wherein each of the beam value partitions being associated with a corresponding one of the internal optical paths, and
selecting transmittance values for the controllable-transparency pixels so that a sum of error terms is minimized, wherein an error term represents a difference between (i) a contribution from light propagating along an internal optical path to one of the exit light beam and (ii) a beam value partition associated with that internal optical path, and wherein the error term is represented as:

$$(L_{i,p} - d_{i,p} L_i^{target})^2,$$

wherein $L_{i,p}$ is a contribution to an exit light beam i by an internal optical path p,
$L_i^{target}$ is a target beam value for an exit light beam i, and wherein $L_i^{target}$ is a target beam value for an exit light beam i, and wherein $d_{i,p} L_i^{target}$ is a beam value partition associated with an internal optical path p that contributes to an exit light beam i.

14. The apparatus of claim 13, wherein the display device further comprising:
a light-emitting layer,
wherein the internal optical paths extend from the light-emitting layer.

15. The apparatus of claim 13, wherein the selecting of the transmittance values comprises iteratively adjusting the transmittance values to reduce the sum of error terms.

16. The apparatus of claim 13, wherein $L_{i,p}$ is a product of factors comprising a contribution strength constant $c_{i,p}$ and at least one transmittance value of at least one controllable-transparency pixel located along the optical path p.

17. The apparatus of claim 13, wherein the selecting of the transmittance values comprises selecting transmittance values that substantially minimize the value of the following expression $$\sum_{i=1}^{I} \sum_{p=1}^{P} W_i c_{i,p}^2 \left( \frac{1}{M} \sum_{m=1}^{M} \prod_{n=1}^{N} T_{n,m,f(n,p,i)} - \frac{d_{i,p}}{c_{i,p}} L_i^{target} \right)^2$$

wherein:
i is an index over exit light beams;
p is an index over internal optical paths;
$W_i$ is a weighting associated with respective light beam i;
$c_{i,p}$ is a contribution strength constant proportional to a contribution of internal optical path p to exit light beam i;
M is a number of multiplexed frames;
m is an index over multiplexed frames;
N is a number of layers of controllable-transparency pixels;
n is an index over controllable-transparency pixel layers;
$f(n, p, i)$ is an index of a controllable-transparency pixel in layer n, the pixel is located along internal optical path p that contributes to an exit light beam i;
$T_{n,m,f(n,p,i)}$ is a transmittance value of a controllable-transparency pixel $f(n, p, i)$ in layer n during multiplexed frame m;
$d_{i,p}$ is a partitioning constant; and
$L_i^{target}$ is a target beam value for an exit light beam i.

18. The apparatus of claim 13, wherein the selecting of the transmittance values comprises selecting transmittance values that substantially minimize the value of the following expression $$\sum_{i=1}^{I} \sum_{p=1}^{P} c_{i,p}^2 \left( \prod_{n=1}^{N} T_{n,f(n,p,i)} - \frac{d_{i,p}}{c_{i,p}} L_i^{target} \right)^2,$$

wherein:
i is an index over an exit light beams;
p is an index over internal optical paths;
$c_{i,p}$ is a contribution strength constant proportional to a contribution of internal optical path p to an exit light beam i;
N is a number of layers of controllable-transparency pixels;
n is an index over controllable-transparency pixel layers;
$f(n, p, i)$ is an index of a controllable-transparency pixel in layer n, the pixel is located along internal optical path p that contributes to an exit light beam i;

$T_{n,f(n,p,i)}$ is a transmittance value of a controllable-transparency pixel $f(n, p, i)$ in layer n;
$d_{i,p}$ is a partitioning constant; and
$L_i^{target}$ is a target beam value for an exit light beam i.

* * * * *